(12) United States Patent
Wang et al.

(10) Patent No.: US 12,101,669 B2
(45) Date of Patent: Sep. 24, 2024

(54) INFORMATION TRANSMISSION METHOD, APPARATUS, AND SYSTEM

(71) Applicant: HUAWEI TECHNOLOGIES CO., LTD., Guangdong (CN)

(72) Inventors: Yu Wang, Hangzhou (CN); Yunfei Qiao, Hangzhou (CN); Rong Li, Hangzhou (CN); Jianwei Zhou, Hangzhou (CN); Hejia Luo, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/702,958

(22) Filed: Mar. 24, 2022

(65) Prior Publication Data

US 2022/0217589 A1   Jul. 7, 2022

Related U.S. Application Data

(63) Continuation of application No. PCT/CN2020/114469, filed on Sep. 10, 2020.

(30) Foreign Application Priority Data

Sep. 25, 2019  (CN) .......................... 201910908756.9
Nov. 21, 2019  (CN) .......................... 201911151266.5

(51) Int. Cl.
  *H04W 36/00* (2009.01)
  *H04B 7/185* (2006.01)
  *H04W 48/12* (2009.01)

(52) U.S. Cl.
  CPC .... *H04W 36/0055* (2013.01); *H04B 7/18513* (2013.01); *H04W 36/0061* (2013.01); *H04W 48/12* (2013.01)

(58) Field of Classification Search
  CPC ......... H04W 36/0055; H04W 36/0061; H04W 48/12; H04W 72/23; H04W 84/06;
  (Continued)

(56) References Cited

U.S. PATENT DOCUMENTS

2015/0372793 A1* 12/2015 Kang ................... H04B 7/0417
                                                                   370/329
2016/0286407 A1    9/2016 Simonsson et al.
(Continued)

FOREIGN PATENT DOCUMENTS

CN    104955054 A    9/2015
CN    105471484 A    4/2016
(Continued)

OTHER PUBLICATIONS

European Search Report for Application No. EP 20868649.3 dated Oct. 18, 2022, 11 pages.
(Continued)

*Primary Examiner* — Eric Myers

(57) ABSTRACT

The technology of this application relates to an information transmission method, an apparatus, and a system. The method includes user equipment receives first indication information sent by a first network device, where the first indication information includes a polarization method of a target cell, and the user equipment performs cell measurement on the target cell based on the polarization method of the target cell. According to the method, the user equipment can obtain the polarization method of the target cell before entering the target cell. In this way, when performing cell handover and reselection, the user equipment can enable, based on the polarization method of the target cell, only a port corresponding to the polarization method of the target
(Continued)

cell, to receive a satellite signal, and perform cell measurement on the target cell, to complete cell handover and reselection procedures.

24 Claims, 16 Drawing Sheets

(58) Field of Classification Search
CPC ......... H04W 36/0072; H04W 36/0083; H04W 36/00837; H04W 36/30; H04B 7/18513; H04B 7/0617; H04B 7/10; H04B 7/2041; H04B 7/18541; Y02D 30/70; H04L 5/001; H04L 5/0091
See application file for complete search history.

(56) References Cited

U.S. PATENT DOCUMENTS

| | | | |
|---|---|---|---|
| 2017/0180038 A1 | 6/2017 | Oza et al. | |
| 2017/0214443 A1* | 7/2017 | Chen | H04B 7/0469 |
| 2018/0132224 A1 | 5/2018 | Cheng et al. | |
| 2019/0132041 A1 | 5/2019 | Takei | |
| 2021/0368456 A1* | 11/2021 | Nilsson | H04B 7/0617 |

FOREIGN PATENT DOCUMENTS

| | | |
|---|---|---|
| CN | 108183740 A | 6/2018 |
| CN | 108988925 A | 12/2018 |
| CN | 109155766 A | 1/2019 |
| CN | 109392044 A | 2/2019 |
| EP | 3193462 A1 | 7/2017 |
| JP | 2016080710 A | 5/2016 |
| JP | 2017532859 A | 11/2017 |
| JP | 2019134249 A | 8/2019 |
| WO | 2014126319 A1 | 8/2014 |
| WO | 2015117406 A1 | 8/2015 |
| WO | 2018127171 A1 | 7/2018 |
| WO | 2018201922 A1 | 11/2018 |
| WO | 2021058576 A1 | 4/2021 |

OTHER PUBLICATIONS

R1-1712297, ZTE et al, Discussion on beam measurement and reporting, 3GPP TSG RAN WG1 Meeting #90 Prague, Czechia, Aug. 21-25, 2017, total 12 pages.

R1-166109, Huawei et al, Antenna structure: impact on MIMO transmission and remaining modeling issues, 3GPP TSG RAN WG1 Meeting #86, Gothenburg, Sweden, Aug. 22-26, 2016, total 7 pages.

R1-1611972, Intel Corporation, Discussion on NR transmit diversity scheme, 3GPP TSG-RAN WG1 #87, Reno, USA Nov. 14-18, 2016, total 6 pages.

Notice of Allowance for Chinese Application No. 201911151266.5 dated Apr. 13, 2022, 5 pages.

Office Action for Chinese Application No. 201911151266.5 dated Oct. 29, 2021, 7 pages.

PCT International Search Report for Application No. PCT/CN2020/114469 dated Sep. 10, 2020, 9 pages.

Huawei, HiSilicon, Discussion on physical layer control procedures for NTN [online], 3GPP TSG RAN WG1 #99 R1-1911859, Nov. 9, 2019.

Notice of Reasons for Rejection for Japanese Application No. 2022-519310 dated May 8, 2023, 16 pages (with translation).

* cited by examiner

INFORMATION TRANSMISSION METHOD, APPARATUS, AND SYSTEM

CROSS-REFERENCE TO RELATED APPLICATIONS

This application is a continuation of International Application No. PCT/CN2020/114469, filed on Sep. 10, 2020, which claims priority to Chinese Patent Application No. 201910908756.9, filed on Sep. 25, 2019, and Chinese Patent Application No. 201911151266.5, filed on Nov. 21, 2019. All of the aforementioned patent applications are hereby incorporated by reference in their entireties.

TECHNICAL FIELD

This application relates to the field of wireless communications technologies, and in particular, to an information transmission method, an apparatus, and a system.

BACKGROUND

Satellite communication is a technology in which a man-made earth satellite is used as a relay station to forward a radio wave, to implement communication between two or more network devices. Compared with conventional terrestrial communication, the satellite communication is characterized by a wide coverage area, a long transmission distance, flexible networking, convenient deployment, and the like. A satellite communications network is fused with terrestrial communication such as 5th generation new radio (5G NR) and long term evolution (LTE), so that a coverage area of a wireless communications network can be greatly extended.

A satellite is relatively far away from ground, and distances between user equipment (UE) and the satellite at locations in a satellite cell are slightly different. Therefore, strength of a signal received by the UE at a cell edge is slightly different from strength of a signal received by the UE at a cell center. Consequently, when the UE is located at the cell edge, strength of signal interference from a neighboring cell is relatively large. To overcome interference, the satellite transmits signals in a polarization multiplexing manner, that is, different satellite cells transmit signals by using different polarization methods. In this manner, when the UE is handed over from a cell to another target cell, or when the UE performs target-cell selection or reselection, because the UE does not know in advance a polarization method used by the target cell, the UE needs to enable ports corresponding to various polarization methods, to measure the target cell. Consequently, energy consumption of the UE during cell handover, cell selection, or cell reselection is relatively high.

SUMMARY

Embodiments of this application provide an information transmission method, an apparatus, and a system, to reduce energy consumption of UE during cell handover, cell selection, or cell reselection.

To achieve the foregoing objective, the following technical solutions are used in the embodiments of this application.

According to a first aspect, this application provides an information transmission method. The method may be applied to user equipment. The user equipment may be, for example, a mobile phone, a tablet computer, an in-vehicle communications device, an on-board communications device, or a wearable device. The method may include: the user equipment obtains first indication information, where the first indication information includes a polarization method of a target cell; and the user equipment receives a cell signal of the target cell based on the polarization method of the target cell.

According to the method, the user equipment can obtain the polarization method of the target cell before entering the target cell. In this way, when performing cell handover and reselection, the user equipment can enable, based on the polarization method of the target cell, only a port corresponding to the polarization method of the target cell, to receive a satellite signal, and perform cell measurement on the target cell, to complete cell handover and reselection procedures. Therefore, in the method provided in this embodiment of this application, energy consumption of the user equipment during cell handover, cell selection, and cell reselection can be reduced, and signal interference from another neighboring cell can be avoided. Alternatively, the user equipment obtains first indication information, where the first indication information includes a polarization method of a bandwidth part (BWP); and the user equipment communicates with the target cell based on the first indication information. Therefore, this embodiment of this application provides a method for adding a polarization indication to a BWP, to indicate, in different beams or a given bandwidth part BWP, the user equipment to perform communication and transmission with the target cell by using an indicated polarization method.

With reference to the first aspect, in a possible implementation, the user equipment receives a radio resource control (RRC) message, where the radio resource control message includes the first indication information.

In this way, the user equipment can obtain the polarization method of the target cell in RRC_CONNECTED (RRC_CONNECTED), so that during cell handover, the user equipment enables the corresponding port based on the polarization method of the target cell, to perform cell measurement on the target cell, without enabling a plurality of ports. In addition, this embodiment of this application provides a method for adding a polarization indication of a BWP in RRC_CONNECTED (RRC_CONNECTED), to indicate, in different beams or a given bandwidth part BWP, the user equipment to complete communication and transmission by using an indicated polarization method. Therefore, energy consumption of the user equipment during cell handover is reduced, and signal interference from another neighboring cell is avoided.

With reference to the first aspect, in a possible implementation, the user equipment receives a system information block (SIB) sent by a first network device, where the system information block includes the first indication information.

In this way, the user equipment can obtain the polarization method of the target cell in RRC_IDLE (RRC_IDLE), so that during cell selection or cell reselection, the user equipment enables the corresponding port based on the polarization method of the target cell, to perform cell measurement on the target cell, without enabling a plurality of ports. Therefore, energy consumption of the user equipment during cell selection or cell reselection is reduced, and signal interference from another neighboring cell is avoided.

With reference to the first aspect, in a possible implementation, the user equipment receives downlink control information (DCI), where the downlink control information includes the first indication information.

In this way, the user equipment learns, from the downlink control information, the polarization method used to receive a cell signal, and enables the port corresponding to the polarization method, to receive a signal sent by the cell to the current user equipment, without enabling a plurality of ports. Therefore, polarization multiplexing and throughput capabilities of a network can be improved, and interference from another cell can be avoided for the user equipment.

With reference to the first aspect, in a possible implementation, the polarization method includes one or more of left hand circular polarization, right hand circular polarization, linear polarization, or elliptical polarization.

According to a second aspect, this application provides an information transmission method. The method may be applied to user equipment. The user equipment may be, for example, a mobile phone, a tablet computer, an in-vehicle communications device, an on-board communications device, or a wearable device. The method includes: the user equipment enables ports corresponding to all polarization methods, to receive a cell signal; and the user equipment determines additional third indication information based on a polarization method of a received cell signal.

According to the method, the polarization method of the cell signal may be further used to indicate other information, such as an information block or a data message. Therefore, the user equipment does not need to additionally send this information, thereby helping improve a throughput rate of information transmission between the user equipment and a base station.

According to a third aspect, this application provides an information transmission method. The method may be applied to a first network device. The first network device may be, for example, a satellite base station, including an evolved NodeB (eNB), a 5G gNodeB (gNB), and the like. The method may include: the first network device obtains a polarization method of a target cell or a polarization method of a bandwidth part BWP; and the first network device generates first indication information, where the first indication information includes the polarization method of the target cell or the polarization method of the bandwidth part BWP; and then sends the first indication information to user equipment, where the first indication information includes the polarization method of the target cell or the polarization method of the bandwidth part BWP.

According to the method, the first network device sends the polarization method of the target cell or the polarization method of the bandwidth part BWP to the user equipment. In this way, when performing cell handover and reselection, the user equipment can enable, based on the polarization method of the target cell, only a port corresponding to the polarization method of the target cell, to receive a satellite signal, and perform cell measurement on the target cell, to complete cell handover and reselection procedures. Therefore, in the method provided in this embodiment of this application, energy consumption of the user equipment during cell handover, cell selection, and cell reselection can be reduced, and signal interference from another neighboring cell can be avoided. In addition, this embodiment of this application provides a method for adding a polarization indication to a BWP, to indicate, in different beams or a given bandwidth part BWP, the user equipment to complete communication and transmission by using an indicated polarization method.

With reference to the third aspect, in a possible implementation, the first network device sends a radio resource control RRC message to the user equipment, where the radio resource control message includes the first indication information.

In this way, the first network device can send the polarization method of the target cell to the user equipment in RRC_CONNECTED (RRC_CONNECTED), so that during cell handover, the user equipment enables the corresponding port based on the polarization method of the target cell, to perform cell measurement on the target cell, without enabling a plurality of ports. Therefore, energy consumption of the user equipment during cell handover is reduced, and signal interference from another neighboring cell is avoided. In addition, this embodiment of this application provides a method for adding a polarization indication of a BWP in RRC_CONNECTED (RRC_CONNECTED), to indicate, in different beams or a given bandwidth part BWP, the user equipment to complete communication and transmission by using an indicated polarization method.

With reference to the third aspect, in a possible implementation, the first network device sends a system information block SIB to the user equipment, where the system information block includes the first indication information.

In this way, the first network device can send the polarization method of the target cell to the user equipment in RRC_IDLE (RRC_IDLE), so that during cell selection or cell reselection, the user equipment enables the corresponding port based on the polarization method of the target cell, to perform cell measurement on the target cell, without enabling a plurality of ports. Therefore, energy consumption of the user equipment during cell selection or cell reselection is reduced, and signal interference from another neighboring cell is avoided.

With reference to the third aspect, in a possible implementation, the first network device sends downlink control information DCI to the user equipment, where the downlink control information includes the first indication information.

In this way, the user equipment can learn, from the downlink control information, the polarization method used to receive a cell signal or the polarization method of the bandwidth part BWP, and enables the port corresponding to the polarization method, to receive a signal sent by the cell to the current user equipment, without enabling a plurality of ports. Therefore, polarization multiplexing and throughput capabilities of a network can be improved, and interference from another cell can be avoided for the user equipment.

With reference to the third aspect, in a possible implementation, the first network device receives second indication information sent by a second network device, where the second indication information includes the polarization method of the target cell, and the target cell belongs to the second network device.

In this way, polarization methods of respective cells may be shared between network devices, so that a network device can properly determine a polarization method of a cell of the network device based on a polarization method of a neighboring cell, thereby improving an inter-cell interference coordination capability.

With reference to the third aspect, in a possible implementation, the polarization method includes one or more of left hand circular polarization, right hand circular polarization, linear polarization, or elliptical polarization.

According to a fourth aspect, this application provides an information transmission method. The method may be applied to a second network device. The second network device may be, for example, a satellite base station, including an evolved NodeB (eNB), a 5G gNodeB (gNB), and the like. The method may include: the second network device sends second indication information to a first network device, where the second indication information includes a polarization method of a target cell, and the target cell belongs to the second network device.

According to the method, polarization methods of respective cells may be shared between network devices, so that a network device can properly determine a polarization method of a cell of the network device based on a polarization method of a neighboring cell, thereby improving an inter-cell interference coordination capability.

According to a fifth aspect, this application provides user equipment. The user equipment may be, for example, a mobile phone, a tablet computer, an in-vehicle communications device, an on-board communications device, or a wearable device. The user equipment includes: a receiving unit, configured to receive first indication information sent by a first network device, where the first indication information includes a polarization method of a target cell; and a processing unit, configured to communicate with the target cell based on the first indication information.

With reference to the fifth aspect, in a possible implementation, the receiving unit is specifically configured to receive a radio resource control RRC message sent by the first network device, where the radio resource control message includes the first indication information.

With reference to the fifth aspect, in a possible implementation, the receiving unit is specifically configured to receive a system information block SIB, where the system information block includes the first indication information.

With reference to the fifth aspect, in a possible implementation, the receiving unit is specifically configured to receive downlink control information DCI, where the downlink control information includes the first indication information.

With reference to the fifth aspect, in a possible implementation, the polarization method includes one or more of left hand circular polarization, right hand circular polarization, linear polarization, or elliptical polarization.

According to a sixth aspect, this application provides user equipment. The user equipment may be, for example, a mobile phone, a tablet computer, an in-vehicle communications device, an on-board communications device, or a wearable device. The user equipment includes: a receiving unit, configured to enable ports corresponding to all polarization methods, to receive a cell signal; and a processing unit, configured to determine additional third indication information based on a polarization method of a received cell signal.

According to a seventh aspect, this application provides a first network device. The first network device may be, for example, a satellite base station, including an evolved NodeB (eNB), a 5G gNodeB (gNB), and the like. The first network device includes: an obtaining unit, configured to obtain a polarization method of a target cell or a polarization method of a bandwidth part BWP; a processing unit, configured to generate first indication information based on the polarization method of the target cell or the polarization method of the bandwidth part BWP, where the first indication information includes the polarization method of the target cell; and a transmission unit, configured to send the first indication information.

With reference to the seventh aspect, in a possible implementation, the processing unit is specifically configured to generate a radio resource control RRC message, where the radio resource control message includes the first indication information.

With reference to the seventh aspect, in a possible implementation, the processing unit is specifically configured to generate a system information block SIB, where the system information block includes the first indication information.

With reference to the seventh aspect, in a possible implementation, the processing unit is specifically configured to generate downlink control information DCI, where the downlink control information includes the first indication information.

With reference to the seventh aspect, in a possible implementation, the polarization method includes one or more of left hand circular polarization, right hand circular polarization, linear polarization, or elliptical polarization.

With reference to the seventh aspect, in a possible implementation, the obtaining unit is specifically configured to receive second indication information sent by a second network device, where the second indication information includes the polarization method of the target cell, and the target cell belongs to the second network device.

According to an eighth aspect, this application provides a second network device. The second network device may be, for example, a satellite base station, including an evolved NodeB (eNB), a 5G gNodeB (gNB), and the like. The second network device includes: a processing unit, configured to send second indication information to a first network device, where the second indication information includes a polarization method of a target cell, and the target cell belongs to the second network device.

According to a ninth aspect, this application provides a communications system. The communications system includes user equipment, a first network device, and a second network device. The user equipment is the user equipment in any one of the first aspect and the implementations of the first aspect or any one of the second aspect and the implementations of the second aspect, the first network device is the first network device in any one of the third aspect and the implementations of the third aspect, and the second network device is the second network device in any one of the fourth aspect and the implementations of the fourth aspect.

According to a tenth aspect, this application provides a computer storage medium. The computer storage medium may be non-volatile. The computer storage medium stores computer-readable instructions. When the computer-readable instructions are executed by a processor, the method provided in any one of the foregoing implementations is implemented.

According to an eleventh aspect, this application provides a computer program product. The computer program product includes computer-readable instructions. When the computer-readable instructions are executed by a processor, the method provided in any one of the foregoing implementations is implemented.

According to a twelfth aspect, this application provides user equipment. The user equipment may be, for example, a mobile phone, a tablet computer, an in-vehicle communications device, an on-board communications device, or a wearable device. The user equipment includes a processor and a memory. The memory is configured to store computer-readable instructions (or referred to as a computer program), and the processor is configured to read the computer-readable instructions to implement the method provided in any one of the foregoing aspects related to the user equipment and the implementations of the foregoing aspects.

In some implementations, the user equipment further includes a transceiver, configured to receive and send data.

According to a thirteenth aspect, this application provides a network device. The first network device may be, for example, a satellite base station, including an evolved NodeB (eNB), a 5G gNodeB (gNB), and the like. The user equipment includes a processor and a memory. The memory is configured to store computer-readable instructions (or referred to as a computer program), and the processor is configured to read the computer-readable instructions to implement the method provided in any one of the foregoing aspects related to the first network device or the second network device and the implementations of the foregoing aspects.

In some implementations, the network device further includes a transceiver, configured to receive and send data.

It may be understood that, for beneficial effects that can be achieved by the foregoing provided user equipment in the fifth aspect and the sixth aspect, the first network device in the seventh aspect, the second network device in the eighth aspect, the communications system in the ninth aspect, the computer storage medium in the tenth aspect, and the computer program product in the eleventh aspect, refer to the beneficial effects in any one of the first aspect to the fourth aspect and the possible implementations of the first aspect to the fourth aspect.

BRIEF DESCRIPTION OF DRAWINGS

To describe technical solutions in embodiments of the present technology or in the current technology more clearly, the following briefly describes the accompanying drawings used in describing the background and the embodiments. It is clear that the accompanying drawings in the following descriptions show merely some embodiments of the present technology, and a person of ordinary skill in the art may still derive other drawings or embodiments based on these drawings or descriptions without creative efforts, and the present technology aims to cover all these derived drawings or embodiments.

DESCRIPTION OF EMBODIMENTS

The following clearly describes technical solutions in embodiments of this application with reference to the accompanying drawings in the embodiments of this application. In descriptions of this application, "/" means "or" unless otherwise specified. For example, A/B may represent A or B. In this application, "and/or" describes only an association relationship for describing associated objects and represents that at least three relationships may exist. For example, A and/or B may represent the following three cases: Only A exists, both A and B exist, and only B exists. In addition, in the descriptions of this application, "plurality" means at least two.

Before the technical solutions in the embodiments of this application are described, a technical scenario of the embodiments of this application is first described.

The technical solutions provided in the embodiments of this application may be applied to a satellite communications system. Satellite communication is a technology in which a man-made earth satellite is used as a relay station to forward a radio wave, to implement communication between two or more network devices. Compared with conventional terrestrial communication, the satellite communication is characterized by a wide coverage area, a long transmission distance, flexible networking, convenient deployment, no geographical condition limitation, and the like, and may be widely used in many fields such as maritime communication, positioning and navigation, disaster relief, a scientific experiment, video broadcasting, and ground observation. The satellite communications system may be fused with terrestrial wireless communications systems such as a 5th generation new radio (5G NR) system, a long term evolution (LTE) system, a global system for mobile communications (GSM), and a universal mobile telecommunications system (UMTS), to implement interconnection and interworking of data transmission. Therefore, a coverage area of a terrestrial wireless communications network can be greatly extended, and the satellite communications system and the terrestrial wireless communications system complement each other to form a comprehensive network communications system that integrates sea, land, air, and space and that implements global seamless coverage.

Figure 1:
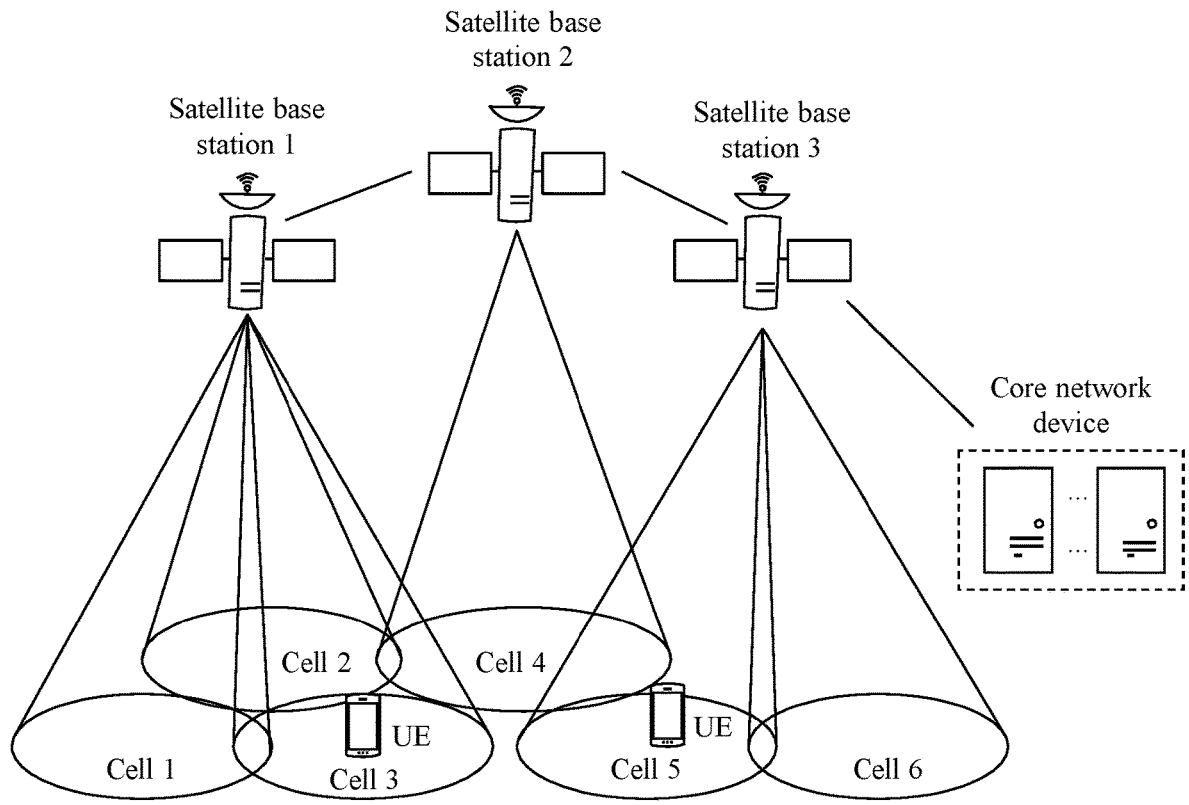
FIG. 1 is an example diagram of an architecture of a current satellite communications system.

FIG. 1 is a diagram of an architecture of a current satellite communications system. As shown in FIG. 1, a satellite communications network may include one or more satellite base stations, one or more pieces of user equipment (UE), and one or more core network devices.

For example, the satellite base station in this embodiment of this application is a man-made earth satellite or a high altitude aircraft that can be used as various wireless communications system base stations (for example, an evolved NodeB (eNB) and a 5G gNodeB (gNB)). The satellite base station is connected to the core network device in a wireless connection manner by using an NG interface, and provides a wireless communication service for the user equipment. The NG interface is an interface between the satellite base station and a core network, for mainly exchanging NAS signaling or the like of the core network, and service data of a user. It is easily understand that in the satellite communications system, each satellite base station can cover one limited geographical area, and can provide a wireless communication service for user equipment in the geographical area. Such a geographical area may be divided into one or more location areas with unique identifiers. Such a location area may be referred to as a cell, and a unique identifier of the location area is used as a cell ID of the cell. For ease of describing the technical solutions in the embodiments of this application, in the subsequent descriptions of the embodiments of this application, a cell of a satellite base station is referred to as a satellite cell.

For example, one satellite base station may include one or more satellite cells. For example, as shown in FIG. 1, a satellite base station 1 includes a cell 1, a cell 2, and a cell 3, a satellite base station 2 includes a cell 4, and a satellite base station 3 includes a cell 5 and a cell 6. When a satellite base station includes a plurality of satellite cells, the satellite cells may be determined based on beams of the satellite base station, for example, a coverage area of each beam is used as one cell; or the satellite cells may be obtained through division according to some rules, for example, a coverage area of the satellite base station is divided into several adjacent cells.

For example, in this embodiment of this application, when being classified from a perspective of an earth orbital type, satellite base stations may include a geostationary earth orbit (GEO) satellite, a medium earth orbit (MEO) satellite and a low earth orbit (LEO) satellite in none-geostationary earth orbit (NGEO) satellites, a high altitude platform station (HAPS), and the like; or when being classified from a perspective of a communication capability, satellite base stations may include a conventional communications satellite, a high throughput satellite (HTS), and the like. A specific form of the satellite base station is not specially limited in this embodiment of this application.

For example, the core network device in this embodiment of this application may include an access and mobility management function (AMF) network element, a mobility management entity (MME), or the like.

For example, the user equipment in this embodiment of this application may be a device that includes a touchscreen, such as a mobile phone, a tablet computer, a desktop computer, a laptop computer, a handheld computer, a notebook computer, an ultra-mobile personal computer (UMPC), a netbook, a cellular phone, a personal digital assistant (PDA), a wireless modem, or an augmented reality (AR)/a virtual reality (VR) device; an in-vehicle communications device; an on-board communications device; or a wearable device. A specific form of the user equipment is not specially limited in this embodiment of this application.

Figure 2:
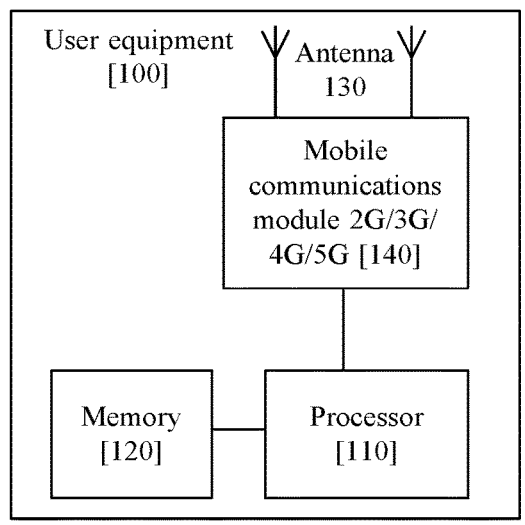
FIG. 2 is an example schematic diagram of a structure of user equipment 100 according to an embodiment of this application.

FIG. 2 is a schematic diagram of a structure of user equipment 100 according to an embodiment of this application. As shown in FIG. 2, the user equipment 100 may include a processor 110, a memory 120, an antenna 130, and a mobile communications module 140. The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent devices, or may be integrated into one or more processors. The controller may generate an operation control signal based on instruction operation code and a time sequence signal, to control instruction fetching and instruction execution.

A memory may be further disposed in the processor 110 to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory, to avoid repeated access. This avoids repeated access and reduces a waiting time of the processor 110, thereby improving system efficiency.

A wireless communication function of the user equipment 100 may be implemented by using the antenna 130, the mobile communications module 140, the modem processor, the baseband processor, and the like. The antenna 130 includes at least one antenna panel, each antenna panel may be configured to transmit and receive electromagnetic wave signals, and the antenna 130 may be configured to cover a single or a plurality of communication bands. In some other embodiments, an antenna 103 may be used in combination with a tuning switch.

The mobile communications module 140 may provide a solution to wireless communication, such as 2G/3G/4G/5G, applied to the user equipment 100. The mobile communications module 140 may include at least one filter, a switch, a power amplifier, a low noise amplifier (LNA), and the like. The mobile communications module 140 may receive an electromagnetic wave by using the antenna 130, perform processing such as filtering and amplification on the received electromagnetic wave, and transmit the processed electromagnetic wave to a modem processor for demodulation. The mobile communications module 140 may further amplify a signal modulated by the modem processor, convert the signal into an electromagnetic wave, and radiate the electromagnetic wave by using the antenna 130. In some embodiments, at least some functional modules of the mobile communications module 140 may be disposed in the processor 110. In some embodiments, at least some functional modules in the mobile communications module 140 and at least some modules in the processor 110 may be disposed in a same device.

The modem processor may include a modulator and a demodulator. The modulator is configured to modulate a to-be-sent low frequency baseband signal into a medium and high frequency signal. The demodulator is configured to demodulate a received electromagnetic wave signal into a low frequency baseband signal. Then, the demodulator transmits the low frequency baseband signal obtained through demodulation to the baseband processor for processing. The baseband processor processes the low frequency baseband signal, and then transfers a processed signal to the application processor. The application processor outputs a sound signal by using an audio device, or displays an image or a video by using a display screen. In some embodiments, the modem processor may be an independent device. In some other embodiments, the modem processor may be independent of the processor 110, and is disposed in a same device as the mobile communications module 140 or another functional module.

In some embodiments, the antenna 130 of the user equipment 100 is coupled to the mobile communications module 140, so that the user equipment 100 can communicate with a network and another device by using a wireless communications technology. The wireless communications technology may include 5th generation new radio (5th generation mobile networks new radio, 5G NR), a global system for mobile communications (GSM), a general packet radio service (GPRS), code division multiple access (CDMA), wideband code division multiple access (WCDMA), time-division code division multiple access (TD-SCDMA), long term evolution (LTE), or the like.

The memory 120 may be configured to store computer-executable program code, and the executable program code includes instructions. The memory 120 may include a program storage area and a data storage area. The program storage area may store an operating system, an application required by at least one function (for example, a sound playing function or an image playing function), and the like. The data storage area may store data (such as audio data or a phone book) created in a use process of the user equipment 100, or the like. In addition, the memory 120 may include a high-speed random access memory, and may further include a non-volatile memory such as at least one magnetic disk storage device, a flash storage device, or a universal flash storage (UFS). The processor 110 runs the instructions stored in the memory 120 and/or the instructions stored in the memory disposed in the processor, to perform various functional applications and data processing of the user equipment 100.

It may be understood that the schematic structure in this embodiment of this application constitutes no specific limitation on the user equipment 100. In some other embodiments of this application, the user equipment 100 may include more or fewer components than those shown in the figure, or combine some components, or split some components, or may have different component arrangements. The components shown in the figure may be implemented by hardware, software, or a combination of software and hardware.

Figure 3:
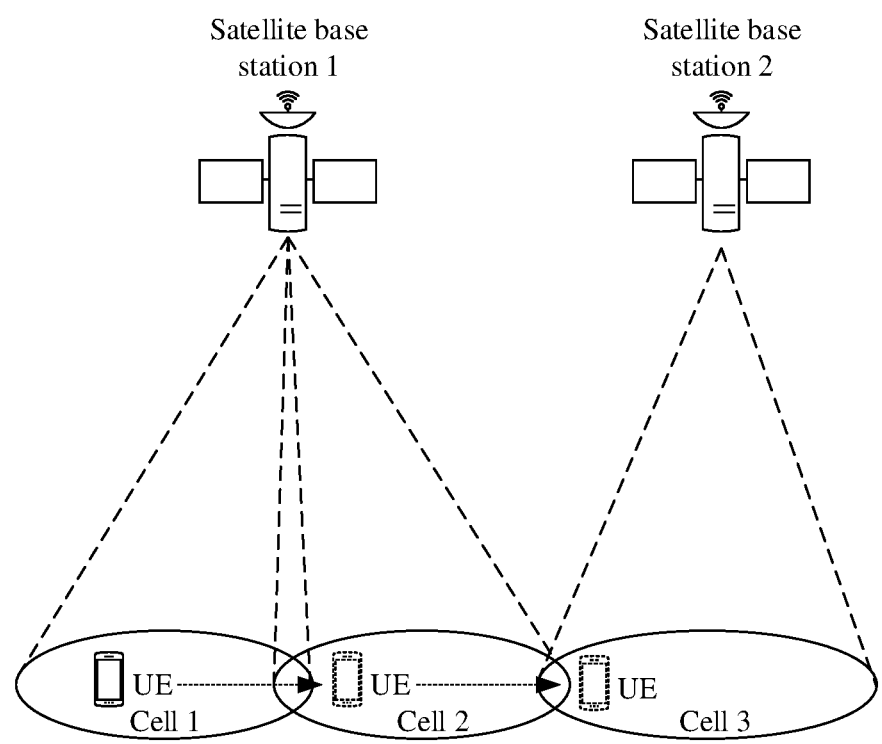
FIG. 3 is an example diagram of a change scene of a location of user equipment relative to a satellite cell in a satellite communications system.

FIG. 3 is a diagram of a change scene of a location of user equipment relative to a satellite cell in a satellite communications system.

As shown in FIG. 3, in the satellite communications system, on one hand, because the user equipment may be displaced, a location of the user equipment relative to a satellite base station may change. Consequently, the location of the user equipment relative to the satellite cell may change. For example, the user equipment may be displaced from a center of the satellite cell to an edge of the satellite cell, or may be displaced from a satellite cell (for example, a satellite cell 1) to another satellite cell (for example, a satellite cell 2). On the other hand, when the satellite base station is a none-geostationary earth orbit satellite, the satellite base station rotates around the earth. Therefore, a location of the satellite cell continuously changes with rotation of the satellite base station. In this case, even if a location of the user equipment does not change, the location of the user equipment relative to the satellite cell changes. Therefore, the user equipment is also caused to enter another satellite cell (for example, a satellite cell 2) from a satellite cell (for example, a satellite cell 1).

For ease of describing the technical solutions in the embodiments of this application, with reference to a scenario shown in FIG. 3, the following naming distinguishing may be performed on satellite cells in the embodiment of this application: In a process in which "user equipment enters another satellite cell from a satellite cell," the "satellite cell" is a source cell or a serving cell, and the "another satellite cell" is a target cell. For example, if the user equipment enters a satellite cell 2 from a satellite cell 1, the satellite cell 1 is a source cell or a serving cell, and the satellite cell 2 is a target cell; or if the user equipment enters a satellite cell 3 from a satellite cell 2, the satellite cell 2 is a source cell or a serving cell, and the satellite cell 3 is a target cell. Further, in the embodiments of this application, a base station to which a serving cell belongs may be referred to as a source base station or a serving base station, and a base station to which a target cell belongs may be referred to as a target base station.

Further, with reference to the scenario shown in FIG. 3, because a satellite base station may include one or more cells, when user equipment enters a target cell from a serving cell, the serving cell and the target cell may belong to a same satellite base station, for example, a satellite cell 1 and a satellite cell 2 both belong to a satellite base station 1; or the serving cell and the target cell may belong to different satellite base stations, for example, a satellite cell 2 belongs to a satellite base station 1, and a satellite cell 3 belongs to a satellite base station 2. Therefore, in a process in which "user equipment enters to another satellite cell from a satellite cell," a serving base station and a target base station may be a same satellite base station, or may be different satellite base stations.

Figure 4:
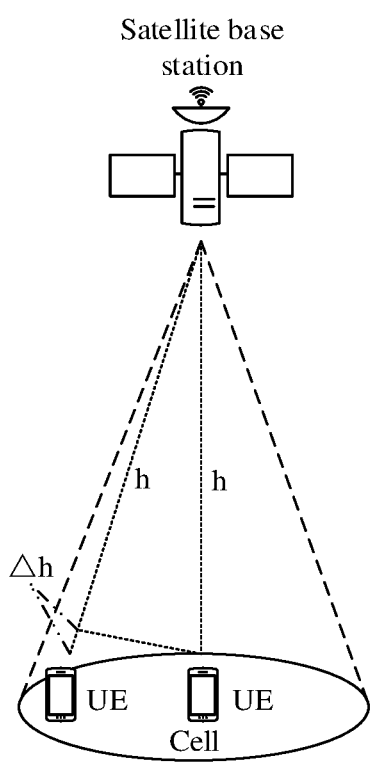
FIG. 4 is an example schematic diagram of distances between user equipment and a satellite base station at different locations in a satellite cell.

FIG. 4 is a schematic diagram of distances between user equipment and a satellite base station at different locations in a satellite cell. As shown in FIG. 4, in a satellite communications system, because the satellite base station is relatively high relative to ground, a difference Δh between distances between the user equipment and the satellite base station at the different locations in the satellite cell occupies a small proportion of a distance h between the user equipment and the satellite base station. Consequently, a far-near effect (that is, a satellite signal strength change effect caused by the distance difference) of a satellite signal in the satellite cell is not obvious. Therefore, strength of satellite signals received by the user equipment at locations in the satellite cell is slightly different (based on known data, a strength difference between a satellite signal received by the user equipment at a cell edge and a satellite signal received by the user equipment at a cell center is about 3 dB). In this case, if the user equipment is located at an edge of a serving cell, high-strength signal interference from a neighboring cell is caused for the user equipment.

Figure 5:
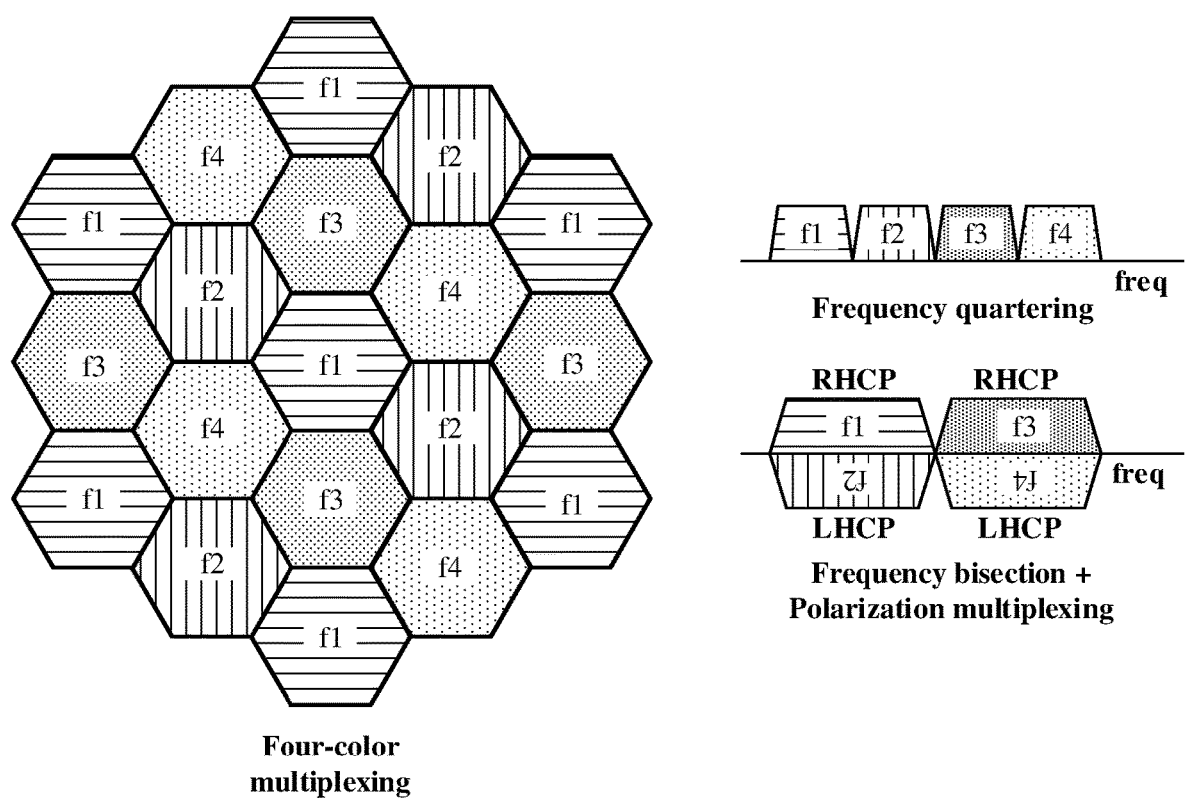
FIG. 5 is an example schematic diagram of four-color multiplexing of a frequency/polarization method of satellite communication.

To overcome interference from a neighboring cell, a satellite communications system uses technologies such as frequency multiplexing and polarization multiplexing for different satellite cells. For example, FIG. 5 is a schematic diagram of four-color multiplexing of a frequency/polarization method of satellite communication. As shown in FIG. 5, in a four-color multiplexing graph, each hexagon represents one satellite cell, a filling pattern of the hexagon represents a frequency (freq) and/or a polarization method of the satellite cell, and different filling patterns correspond to different signal frequencies and/or polarization methods. In the four-color multiplexing solution shown in FIG. 5, a signal frequency and/or a polarization method of any satellite cell are/is different from signal frequencies and/or polarization methods of all neighboring cells of the satellite cell. For example, when four-color multiplexing is implemented in a frequency quartering manner, four different frequencies f1, f2, f3, and f4 need to be configured. In this case, signal frequencies of adjacent satellite cells are different. For another example, when four-color multiplexing is implemented in a frequency bisection plus polarization multiplexing manner, two different signal frequencies f1 and f3 (in this case, f1=f2 and f3=f4 in FIG. 5), and two different polarization methods, for example, left hand circular polarization (LHCP) and right hand circular polarization (DHCP), may be used to obtain four frequency and polarization method combinations, and adjacent satellite cells may be configured to use different combination manners.

Figure 6:
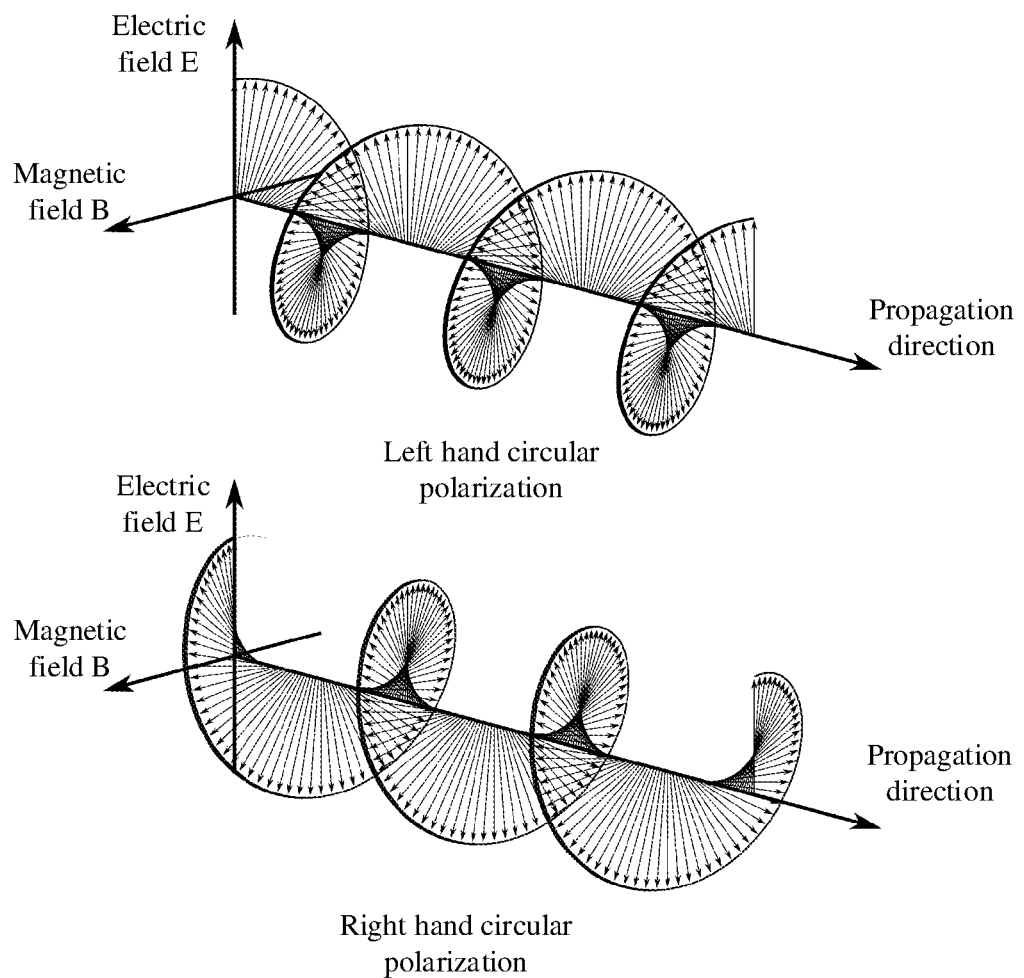
FIG. 6 is an example schematic diagram of a polarization method of an electromagnetic wave.

FIG. 6 is a schematic diagram of a polarization method of an electromagnetic wave. The following further describes, with reference to FIG. 6, the left hand circular polarization and the right hand circular polarization in the embodiments of this application. Polarization is the nature that a transverse wave (such as an electromagnetic wave propagating in space) can oscillate in different directions. An electric field and a magnetic field of the electromagnetic wave are perpendicular to each other. Conventionally, a polarization direction of the electromagnetic wave is a polarization direction of the electric field. In free space, the electromagnetic wave propagates in a transverse wave manner, that is, both the electric field and the magnetic field are perpendicular to a propagation direction of the electromagnetic wave. If the electric field oscillates in only one direction, this is referred to as "linear polarization" or "planar polarization". If the electric field rotates based on a wave frequency of the electromagnetic wave, and a circle is plotted based on an electric field vector with a time change, this is referred to as "circular polarization." If an ellipse is plotted, this is referred to as "elliptical polarization." For "circular polarization," viewed from a source of the electromagnetic wave to the propagation direction of the electromagnetic wave, if the electric field counterclockwise rotates with a time change, a polarization method of the electromagnetic wave is left hand circular polarization; or if the electric field clockwise rotates with a time change, a polarization method of the electromagnetic wave is right hand circular polarization. For "elliptical polarization," viewed from a source of the electromagnetic wave to the propagation direction of the electromagnetic wave, if the electric field counterclockwise rotates with a time change, a polarization method of the electromagnetic wave is left hand elliptical polarization; or if the electric field clockwise rotates with a time change, a polarization method of the electromagnetic wave is right hand elliptical polarization.

Figure 7:
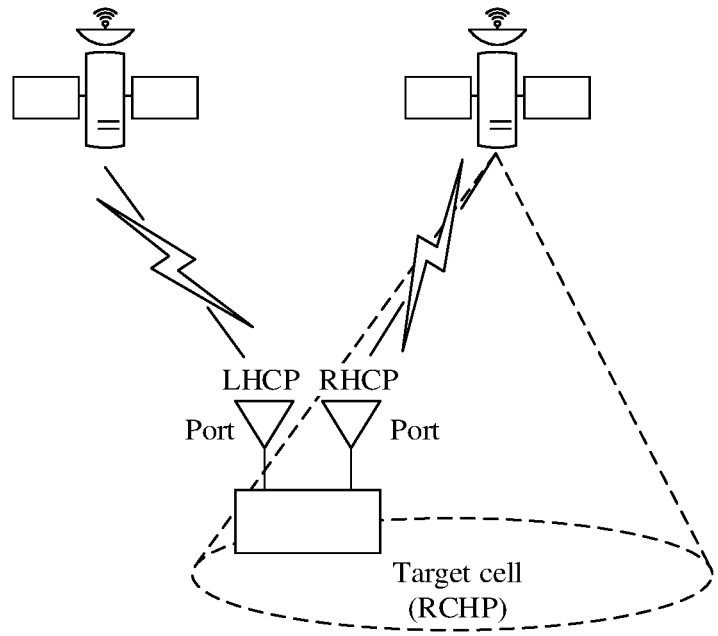
FIG. 7 is an example schematic diagram in which user equipment receives a satellite signal in a polarization multiplexing scenario.

FIG. 7 is a schematic diagram in which user equipment receives a satellite signal in a polarization multiplexing scenario. As shown in FIG. 7, to ensure that the user equipment can correctly receive and demodulate satellite signals sent by a satellite base station by using various polarization methods, the user equipment needs to configure a corresponding receive port for each polarization method, so that the user equipment can select a corresponding receive port based on a polarization method of a satellite signal of a serving base station, to receive and demodulate the satellite signal. That is, only when a polarization method of a satellite signal is the same as a polarization method of a receive port, the user equipment can correctly receive and demodulate the satellite signal. Further, as shown in FIG. 7, in the polarization multiplexing scenario, when the user equipment enters a target cell from a source cell, because the user equipment does not know in advance a polarization method used by the target cell, the user equipment needs to simultaneously enable ports corresponding to all polarization methods, to ensure that the user equipment can correctly receive and demodulate a satellite signal of the target cell. However, the simultaneously enabling ports corresponding to all polarization methods increases power consumption of the user equipment, and may further cause the user equipment to receive and demodulate a satellite signal of another neighboring cell, causing interference to signal receiving and demodulation of the target cell.

In the method provided in the embodiments of this application, before user equipment enters a target cell from a source cell, the user equipment may obtain a polarization method of the target cell. In this way, when performing cell handover and reselection, the user equipment can enable, based on the polarization method of the target cell, only a port corresponding to the polarization method of the target cell, to receive a satellite signal, and perform cell measurement on the target cell, to complete cell handover and reselection procedures. Therefore, in the method provided in the embodiments of this application, energy consumption of the user equipment during cell handover can be reduced, and signal interference from another neighboring cell can be avoided.

An information transmission method provided in the embodiments of this application may be applied to a wireless communications system. The wireless communications system includes but is not limited to a satellite communications system, a 5th generation new radio 5G NR system, a long term evolution LTE system, a global system for mobile communications GSM, a universal mobile telecommunications system UMTS, a wireless local area network Wi-Fi, and the like. Based on the foregoing various wireless communications systems, an execution body of a method that is for indicating a cell polarization method in a wireless network and that is provided in the embodiments of this application may include user equipment (for example, user equipment 100) on a user side of any one of the foregoing wireless communications systems, and a network device (for example, a satellite base station (including an evolved NodeB eNB, a 5G gNodeB gNB, and the like), and an evolved NodeB eNB, a 5G gNodeB gNB, a wireless access point (AP), and customer premises equipment (CPE) that are constructed on ground) on a network side of any one of the foregoing communications systems. The following uses the satellite communications system as an example to specifically describe the information transmission method provided in the embodiments of this application.

Embodiment (1)

Figure 8:
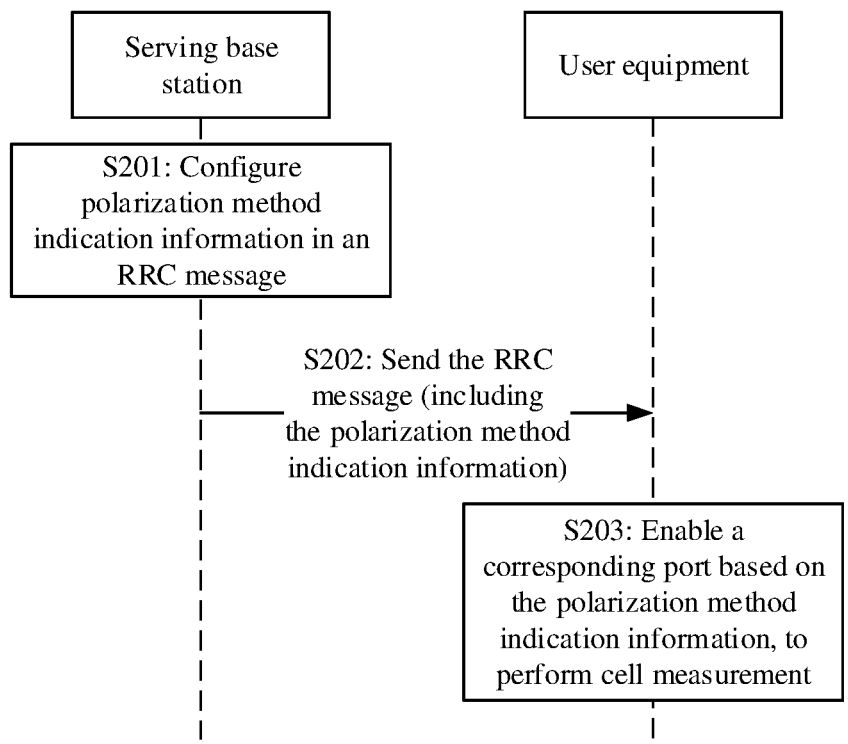
FIG. 8 is an example flowchart of an information transmission method according to a first embodiment of this application.

This embodiment of this application provides an information transmission method. As shown in FIG. 8, the method may include steps S201 to S203.

Step S201: A serving base station configures first indication information in a radio resource control (RRC) message, where the first indication information is polarization method indication information, and the polarization method indication information is used to indicate a polarization method of a target cell or a polarization method of a bandwidth part BWP. A specific message format of the polarization method of the bandwidth part BWP is specifically described in Embodiment (6).

During specific implementation, the polarization method indication information may be configured in, for example, a MobilityControlInfo information element (MobilityControlInfo information element) field of the RRC message. For example, a MobilityControlInfo information element that includes the polarization method indication information may have the following message format:

| MobilityControlInfo information element |
| --- |
| -- ASN1START (-- ASN1START) <br> -- TAG-MEAS-CONFIG-START (-- TAG-MEAS-CONFIG-START) <br> MeasureConfig (MeasureConfig) ::=  sequence (Sequence) { <br> Polarization (Polarization)  ENUMERATED (ENUMERATED) {left hand circular polarization (LHCP), right hand circular polarization (RHCP)} <br> } <br> -- TAG-MEAS-CONFIG-STOP (-- TAG-MEAS-CONFIG-STOP) <br> -- ASN1STOP (-- ASN1STOP) |

For example, for implementation of content of the polarization (Polarization) field in the MobilityControlInfo information element, refer to a manner described in Table 1:

TABLE 1

| MobilityControlInfo field descriptions (MobilityControlInfo field descriptions) |
| --- |
| Polarization (Polarization) <br> 1 bit (bit), cell polarization method; |

According to the descriptions in Table 1, the polarization (Polarization) method of the target cell may be indicated by adding a bit value whose length is 1 bit to the RRC message, corresponding to a case in which the target cell may use, for example, left hand circular polarization or right hand circular polarization. In this case, a bit value 1 may be used to indicate left hand circular polarization, and a bit value 0 may be used to indicate right hand circular polarization; or a bit value 1 may be used to indicate right hand circular polarization, and a bit value 0 may be used to indicate left hand circular polarization. It should be additionally noted herein that polarization methods of the target cell that are specifically indicated by using the bit value 1 and the bit value 0 may be determined by the serving base station and user equipment through negotiation, or may be determined according to a corresponding configuration and protocol. A correspondence between a bit value and a polarization method is not specifically limited in this embodiment of this application.

For example, for implementation of content of the polarization (Polarization) field in the MobilityControlInfo information element, refer to a manner described in Table 2:

TABLE 2

| MobilityControlInfo field descriptions (MobilityControlInfo field descriptions) |
| --- |
| Polarization (Polarization) <br> 2 bits (bit), cell polarization method; |

According to the descriptions in Table 2, the polarization (Polarization) method of the target cell may be indicated by adding a bit value sequence whose length is 2 bits to the RRC message, corresponding to a case in which the target cell may have two or more polarization methods. For example, when the target cell may use left hand circular polarization, right hand circular polarization, left hand elliptical polarization, or right hand elliptical polarization, a bit value sequence 00 may be used to represent left hand circular polarization, a bit value sequence 01 may be used to represent right hand circular polarization, a bit value sequence 10 may be used to represent left hand elliptical polarization, and a bit value sequence 11 may be used to represent right hand elliptical polarization. It should be additionally noted herein that polarization methods of the target cell that are specifically indicated by using different values of the bit value sequence may be determined by the serving base station and user equipment through negotiation, or may be determined according to a corresponding configuration and protocol, and may be configured in the user equipment and the serving base station. A correspondence between a bit value sequence and a polarization method is not specifically limited in this embodiment of this application.

It is easily understand that, in this embodiment of this application, the length of the bit value or the bit value sequence that is used to indicate the polarization method of the target cell and that is added to the RRC message may be determined based on a quantity of polarization methods that may be used by the target cell. Therefore, the length of the bit value or the bit value sequence may not be limited to 1 bit or 2 bits. When the target cell may use more polarization methods to transmit satellite signals, a person skilled in the art can easily figure out, based on the disclosure in the embodiments of this application, that the length of the bit value sequence continues to be increased, for example, is increased to 3 bits or 4 bits, to indicate more polarization methods. This falls within the protection scope of the embodiments of this application.

It should be additionally noted that, in a specific implementation of step S201, the polarization method indication information may be used to indicate polarization methods of a plurality of neighboring cells of a serving cell, and the target cell to which the user equipment is handed over is one of the plurality of neighboring cells. As shown in Table 3, the polarization method indication information may specifically include a cell ID (CID) of a neighboring cell and a corresponding bit value or bit value sequence used to indicate a polarization method.

TABLE 3

| Cell ID | Polarization method |
| --- | --- |
| 4600012345 | 0 |
| 4600012346 | 1 |

TABLE 3-continued

| Cell ID | Polarization method |
|---|---|
| 4600012347 | 1 |
| 4600012348 | 0 |
| ... | ... |

Step S202: The serving base station sends, to the user equipment, the RRC message that includes the polarization method indication information.

For example, in 5th generation new radio (5G NR) and long term evolution (LTE), the user equipment and the serving base station may include two or three RRC modes. Specifically, in 5G NR, the user equipment and the serving base station may include three RRC modes: RRC_CONNECTED (RRC_CONNECTED), RRC_IDLE (RRC_IDLE), and RRC_INACTIVE (RRC_INACTIVE), and in LTE, the user equipment and the serving base station may include two RRC modes: RRC_CONNECTED (RRC_CONNECTED) and RRC_IDLE (RRC_IDLE).

In RRC_CONNECTED, an RRC connection is established between the user equipment and the serving base station, so that the user equipment can exchange signaling or data with the serving base station. When the UE moves between cells, a network side controls the user equipment to perform cell handover (for example, the user equipment to be handed over from the serving cell to the target cell), that is, the network side controls mobility of the user equipment. In RRC_IDLE, there is no RRC connection between the user equipment and the base station. If the user equipment needs to exchange signaling or data with the base station, the user equipment needs to initiate an RRC connection to the base station, to enter RRC_CONNECTED from RRC_IDLE. The user equipment monitors paging information of the base station in RRC_IDLE. When moving between cells, the user equipment performs cell reselection, that is, the user equipment controls mobility of the user equipment. In RRC_INACTIVE, there is no RRC connection between the user equipment and the base station. However, the last serving base station of the user equipment stores context information of the user equipment, so that the user equipment is quickly transferred to RRC_CONNECTED from RRC_INACTIVE. When moving between cells, the user equipment performs cell reselection, that is, the user equipment controls mobility of the user equipment.

Based on the foregoing possible RRC modes, step S202 may be selectively implemented in RRC_CONNECTED. When the user equipment and the serving base station are in RRC_CONNECTED, an RRC connection is established between the serving base station and the user equipment, so that the serving base station can send, to the user equipment by using the RRC connection, the RRC message that includes the polarization method indication information.

It should be additionally noted that, in a specific implementation of step S202, the serving base station may actively send, to the user equipment, the RRC message that includes the polarization method indication information, without receiving any request from the user equipment; or the user equipment may actively initiate, to the serving base station, a request message used to obtain the polarization indication information, so that when receiving the request message, the serving base station sends, to the user equipment based on the request message, the RRC message that includes the polarization method indication information.

Optionally, when the user equipment obtains the polarization indication information from the RRC message of the serving base station through demodulation, the user equipment may further send an acknowledgment message, such as an ACK message (message acknowledgment), to the serving base station, to indicate that the serving base station does not need to continue to send, to the user equipment, the RRC message that includes the polarization indication information, thereby reducing signaling overheads.

Step S203: The user equipment communicates with the target cell based on the polarization method of the target cell or the polarization method of the BWP.

Further, the user equipment enables a corresponding port based on the polarization method of the target cell, to measure the target cell.

Figure 9:
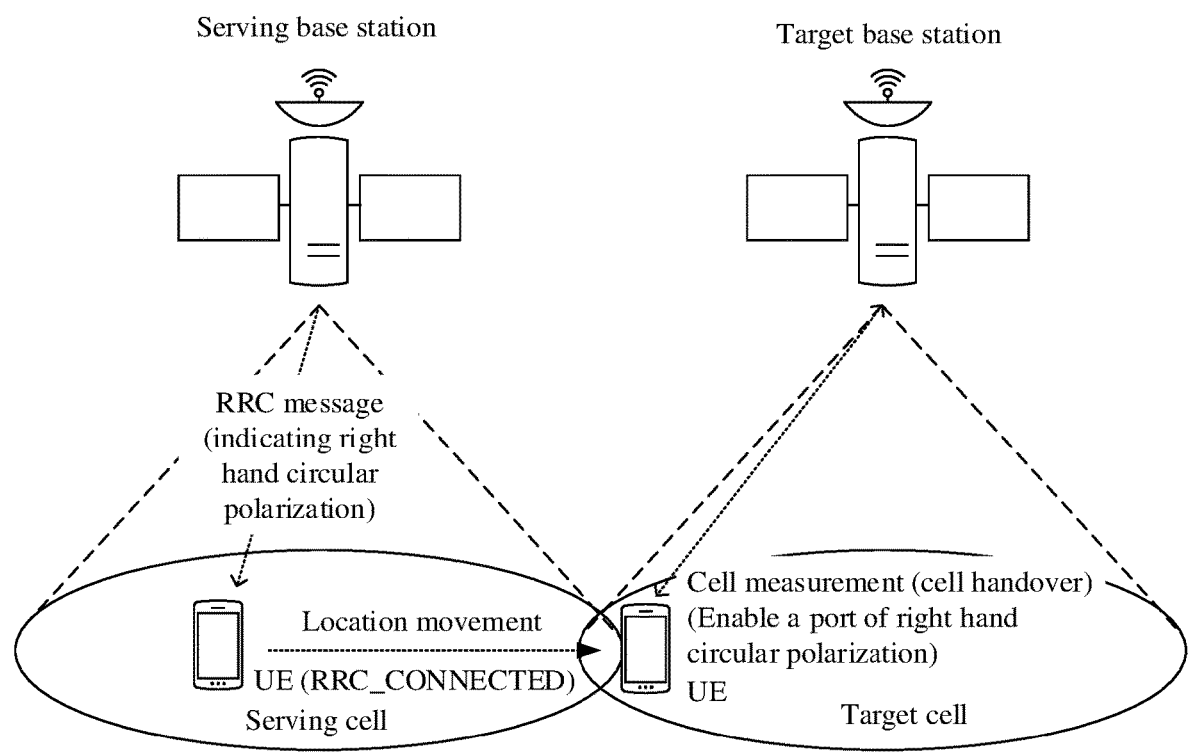
FIG. 9 is an example schematic diagram of a scenario in which user equipment performs cell handover according to a first embodiment of this application.

FIG. 9 is a schematic diagram of a scenario in which user equipment performs cell handover according to an embodiment of this application. As shown in FIG. 9, in RRC_CONNECTED, when the user equipment moves to a target cell from a serving cell, the user equipment may perform a cell handover procedure. The cell handover procedure may usually include the following three steps:

Step 1: Measurement. The user equipment performs cell measurement on the target cell, and reports a measurement result to a serving base station.

Step 2: Determining. The serving base station evaluates the measurement result, and considers an area limitation status of the user equipment, to determine whether cell handover is to be performed.

Step 3: Handover. When determining that cell handover is to be performed, the serving base station performs RRC connection reconfiguration on the user equipment, so that the user equipment performs a random access procedure on the target cell, and establishes an RRC connection to the target cell.

In step S203 in this embodiment of this application, at least energy consumption of the user equipment in a cell measurement step (that is, step 1) of a cell handover procedure can be reduced, and accuracy of a cell measurement result can be improved. During specific implementation, the serving base station may notify the user equipment of parameters, such as an object that needs to be measured (for example, a signal to interference plus noise ratio (SINR), reference signal received quality (RSRQ), or reference signal received power (RSRP)), a cell list, a measurement result reporting manner, and a measurement identifier. The user equipment determines, based on the parameters, the target cell that needs to be measured, enables the corresponding port based on the polarization method that is of the target cell and that is indicated by the polarization method indication information, to measure the target cell, and reports a measurement result to the serving base station.

For example, as shown in FIG. 9, before moving to the target cell, the user equipment receives polarization method indication information from the serving base station. If the polarization method indication information indicates that a polarization method of the target cell is right hand circular polarization, when the user equipment moves to the target cell, the user equipment may enable only a port corresponding to right hand circular polarization, to measure the target cell, without enabling all ports. Therefore, energy consumption of the user equipment during cell measurement can be reduced. In addition, because the user equipment does not enable a port corresponding to another polarization method, the user equipment does not demodulate an electromagnetic wave signal transmitted by using the another polarization method, thereby avoiding interference caused for the user equipment during target-cell measurement, and improving accuracy of a measurement result.

It should be additionally noted that, in this embodiment of this application, the port corresponding to the polarization method may be a physical port or may be a logical port. The physical port may be, for example, an antenna port of the user equipment. The logical port may be, for example, a logical port distinguished by using a reference signal or a link. Specifically, when a plurality of physical antennas are used to transmit one reference signal, these physical antennas may correspond to a same logical port. When reference signals of different links are transmitted by using a same physical antenna, the physical antenna may correspond to a plurality of logical ports. A specific form of the port corresponding to the polarization method is not limited in this embodiment of this application.

It may be learned from the foregoing descriptions that, in the method provided in this embodiment of this application, the serving base station configures the polarization method indication information in the RRC message, so that the user equipment learns the polarization method of the target cell before performing cell handover, so that when performing cell handover, the user equipment can enable the corresponding port based on the polarization method of the target cell, to perform cell measurement on the target cell, without enabling a plurality of ports. Therefore, in the method provided in this embodiment of this application, energy consumption of the user equipment during cell handover can be reduced, interference from another cell can be avoided for the user equipment during cell measurement, and accuracy of a measurement result can be improved.

Embodiment (2)

Figure 10:
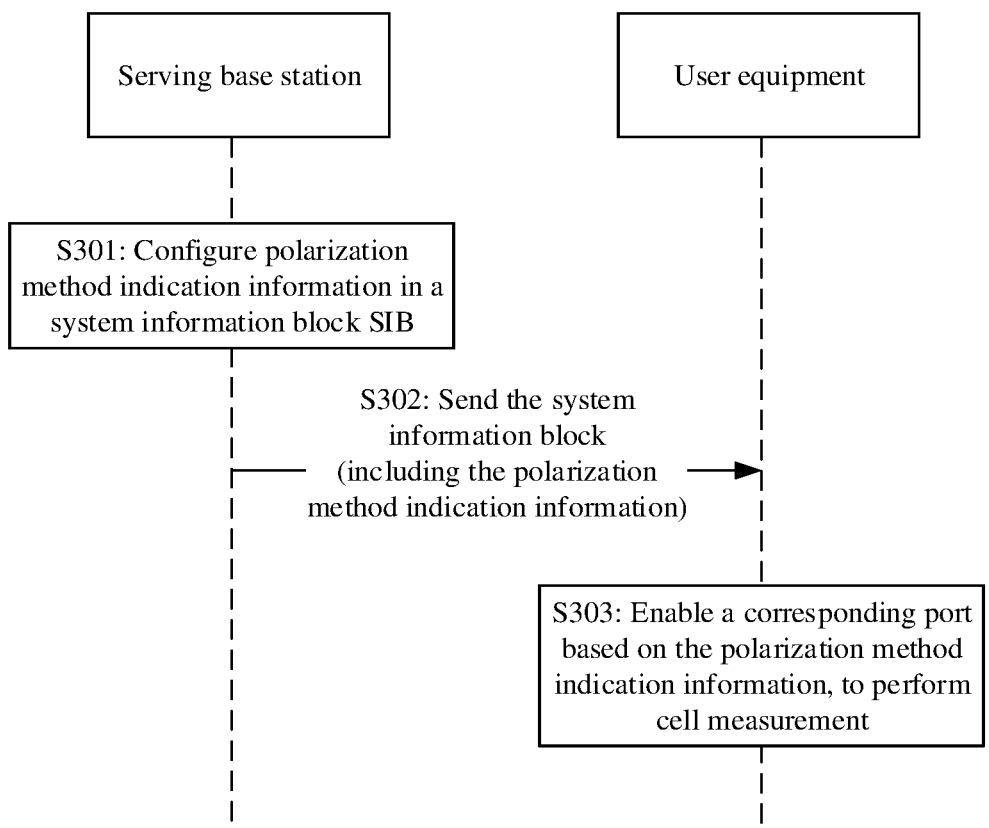
FIG. 10 is an example flowchart of an information transmission method according to a second embodiment of this application.

This embodiment of this application provides an information transmission method. As shown in FIG. 10, the method may include steps S301 to S303.

Step S301: A serving base station configures polarization method indication information in a system information block (SIB) of a serving cell, where the polarization method indication information is used to indicate a polarization method of a target cell or is used to indicate a polarization method of a BWP.

During specific implementation, the system information block SIB usually includes a plurality of types, for example, a SIB 1 to a SIB x (where x is a positive integer greater than 1), and the polarization method indication information may be configured in one or more types of the system information block SIB.

For example, in 5G NR and LTE systems, some SIB types include cell-reselection-related information, for example:

a SIB 2 includes cell reselection information, mainly related to the serving cell;

a SIB 3 includes information about a cell-reselection-related serving frequency and intra-frequency neighboring cell; and a SIB 4 includes information about another cell-reselection-related NR frequency and intra-frequency neighboring cell.

Therefore, the serving base station may preferably configure the polarization method indication information in a SIB type that includes cell-reselection-related information, such as the SIB 2, the SIB 3, or the SIB 4.

For example, a system information block SIBx that includes the polarization method indication information may have the following message format:

| SIBx message |
|---|
| -- ASN1START (-- ASN1START)<br>-- TAG-MEAS-CONFIG-START (-- TAG-MEAS-CONFIG-START)<br>System information block (SIBx) ::=    sequence (Sequence) {<br>Polarization (Polarization)    ENUMERATED (ENUMERATED) {left hand circular polarization (LHCP), right hand circular polarization (RHCP)}<br>}<br>-- TAG-MEAS-CONFIG-STOP (-- TAG-MEAS-CONFIG-STOP)<br>-- ASN1STOP (-- ASN1STOP) |

For example, for implementation of content of the polarization (Polarization) field in the system information block SIBx, refer to a manner described in Table 4:

TABLE 4

| System information block SIBx field descriptions (SIBx message field descriptions) |
|---|
| Polarization (Polarization)<br>1 bit (bit), cell polarization method; |

According to the descriptions in Table 4, the polarization (Polarization) method of the target cell may be indicated by adding a bit value whose length is 1 bit to the system information block SIBx. For example, when the target cell may use left hand circular polarization or right hand circular polarization, a bit value 1 may be used to indicate left hand circular polarization, and a bit value 0 may be used to indicate right hand circular polarization; or a bit value 1 may be used to indicate right hand circular polarization, and a bit value 0 may be used to indicate left hand circular polarization. It should be additionally noted herein that polarization methods of the target cell that are specifically indicated by using the bit value 1 and the bit value 0 may be determined by the serving base station and user equipment through negotiation, or may be determined according to a corresponding configuration and protocol. A correspondence between a bit value and a polarization method is not specifically limited in this embodiment of this application.

For example, for implementation of content of the polarization (Polarization) field in the system information block SIBx, refer to a manner described in Table 5:

TABLE 5

| System information block SIBx field descriptions (SIBx message field descriptions) |
|---|
| Polarization (Polarization)<br>2 bits (bit), cell polarization method; |

According to the descriptions in Table 5, the polarization (Polarization) method of the target cell may be indicated by adding a bit value sequence whose length is 2 bits to the system information block SIBx, to indicate that the target cell may have more polarization methods. For a specific example in which a bit value sequence whose length is 2 bits is used to indicate the polarization method, refer to Embodiment (1) of this application.

It is easily understand that, in this embodiment of this application, the length of the bit value or the bit value sequence that is used to indicate the polarization method of the target cell and that is added to the system information block SIBx may be determined based on a quantity of polarization methods that may be used by the target cell. Therefore, the length of the bit value or the bit value sequence may not be limited to 1 bit or 2 bits. When the target cell may use more polarization methods to transmit satellite signals, a person skilled in the art can easily figure out, based on the disclosure in the embodiments of this application, that the length of the bit value sequence continues to be increased, for example, is increased to 3 bits or 4 bits, to indicate more polarization methods. This falls within the protection scope of the embodiments of this application.

It should be additionally noted that, in a specific implementation of step S301, the polarization method indication information may be used to indicate polarization methods of the serving cell and a plurality of neighboring cells of the serving cell, and the target cell obtained after the user equipment performs cell selection or cell reselection may be the serving cell, or may be one of the plurality of neighboring cells. For a specific example in which the polarization method indication information is used to indicate polarization methods of a plurality of cells, refer to Table 3 in Embodiment (1).

Step S302: The serving base station sends, to the user equipment, the system information block that includes the polarization method indication information.

According to the content described in Embodiment (1), the user equipment may include three RRC modes: RRC_CONNECTED, RRC_IDLE, and RRC_INACTIVE. Step S302 may be selectively implemented in RRC_IDLE or RRC_INACTIVE. For example, when the user equipment and the serving base station are in RRC_IDLE, there is no RRC connection between the serving base station and the user equipment, so that the serving base station can send the polarization method indication information to the user equipment by using the system information block SIBx.

During specific implementation, the serving base station may periodically send the system information block SIBx in a specific SI (SystemInformation) window. Therefore, the user equipment may periodically receive and decode the system information block SIBx in the corresponding SI window, to obtain the polarization method indication information.

Step S303: The user equipment communicates with the target cell based on first indication information.

Further, the user equipment may enable a corresponding port based on the polarization method that is of the target cell and that is indicated by the polarization method indication information, to measure the target cell.

Usually, after being powered on, the user equipment performs a cell selection procedure, to select, as quickly as possible, a cell whose channel quality meets a condition, for camping. After the user equipment performs the cell selection procedure, in RRC_IDLE (RRC_IDLE), the user equipment needs to persistently perform cell reselection, to camp on a cell with a higher priority or better channel quality.

Similar to a cell handover procedure, when performing a cell selection or cell reselection procedure, the user equipment also needs to perform cell measurement on the target cell. In step S303 in this embodiment of this application, energy consumption of the user equipment during cell measurement in the cell selection or cell reselection procedure can be reduced, and accuracy of a cell measurement result can be improved.

Figure 11:
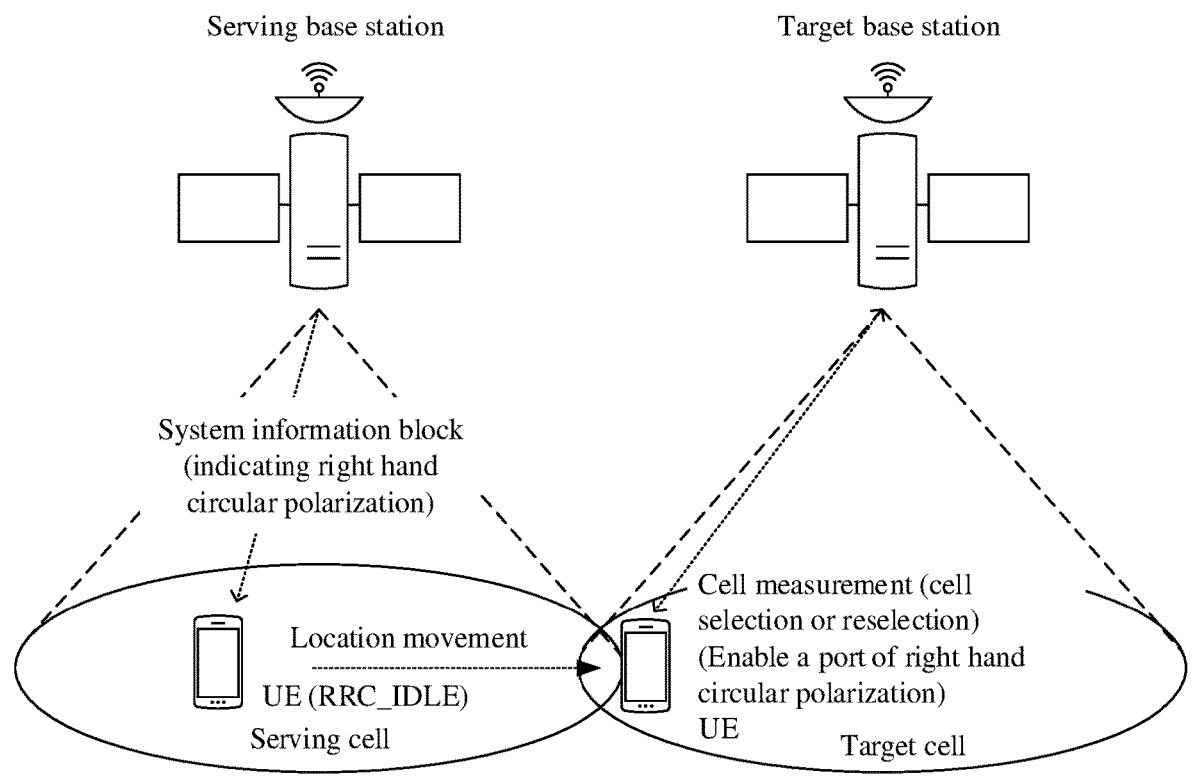
FIG. 11 is an example schematic diagram of a scenario in which user equipment performs cell reselection according to a second embodiment of this application.

FIG. 11 is a schematic diagram of a scenario in which user equipment performs cell reselection according to an embodiment of this application. For example, as shown in FIG. 11, in RRC_IDLE, the user equipment receives a system information block that is of a serving cell on which the user equipment camps and that includes polarization method indication information. If the polarization method indication information indicates that a polarization method of a target cell is right hand circular polarization, when the user equipment is located in the target cell, if the user equipment needs to perform cell selection or reselection, the user equipment may enable only a port corresponding to right hand circular polarization, to measure the target cell, without enabling all ports. Therefore, energy consumption of the user equipment during cell measurement can be reduced. In addition, because the user equipment does not enable a port corresponding to another polarization method, the user equipment does not demodulate an electromagnetic wave signal transmitted by using the another polarization method, thereby avoiding interference caused for the user equipment during target-cell measurement, and improving accuracy of a measurement result.

It should be additionally noted that, before and after the user equipment performs a cell reselection or selection procedure, cells on which the user equipment camps may be a same cell, that is, a serving cell and a target cell are a same cell; or cells on which user equipment camps may not be a same cell, that is, a serving cell and a target cell are different cells. It may be learned that, with reference to Embodiment (1) and Embodiment (2), the serving cell and the target cell in the embodiments of this application are defined based on cells accessed by the user equipment before and after a cell handover, reselection, or selection procedure, and do not constitute cell division or isolation at a geographical level.

It may be learned from the foregoing descriptions that, in the method provided in this embodiment of this application, the serving base station configures the polarization method indication information in the system information block of the serving cell, so that the user equipment learns the polarization method of the target cell, so that when performing cell selection and reselection, the user equipment can enable the corresponding port based on the polarization method of the target cell, to perform cell measurement on the target cell, without enabling a plurality of ports. Therefore, in the method provided in this embodiment of this application, energy consumption of the user equipment during cell selection and reselection can be reduced, interference from another cell can be avoided for the user equipment during cell measurement, and accuracy of a measurement result can be improved.

Embodiment (3)

Figure 12:
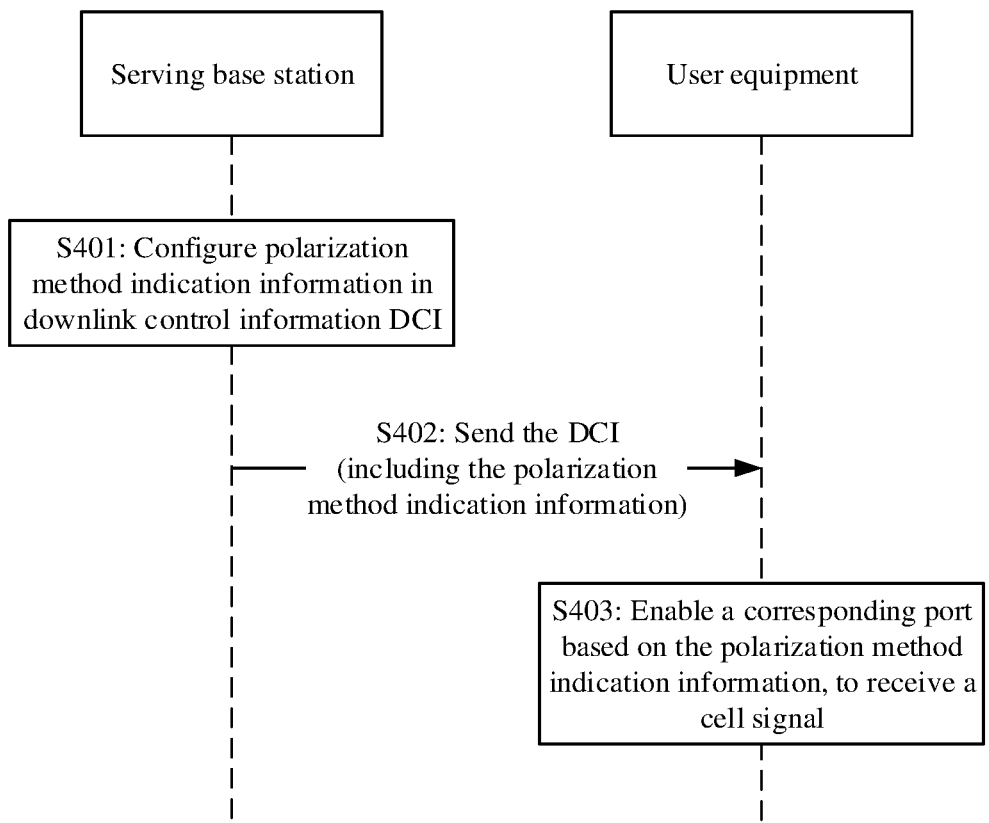
FIG. 12 is an example flowchart of an information transmission method according to a third embodiment of this application.

This embodiment of this application provides a method for indicating a polarization method in a wireless network. As shown in FIG. 12, the method may include steps S401 to S403.

Step S401: A satellite base station configures polarization method indication information in downlink control information (DCI), where the polarization method indication information is used to indicate a polarization method in which user equipment receives a signal of a current cell or a polarization method of a BWP.

During specific implementation, the current cell is a satellite cell currently accessed by the user equipment, including the foregoing serving cell and target cell, and the satellite base station is a base station to which the current cell belongs, including the foregoing serving base station and target base station. One satellite cell may simultaneously have cell signals in a plurality of polarization methods. When a plurality of pieces of user equipment access a satellite cell, a satellite base station may use a corresponding polarization method to send a cell signal for each piece of user equipment, and configure, in downlink control information corresponding to each piece of user equipment, a polarization method that should be used by the user equipment when the user equipment receives the cell signal.

Figure 13:
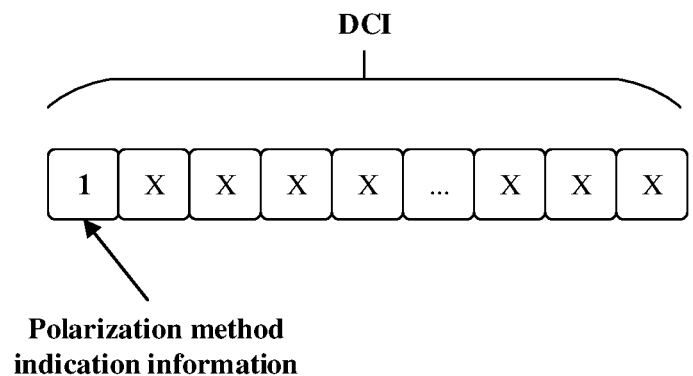
FIG. 13 is an example schematic diagram of a message format of downlink control information according to a third embodiment of this application.

FIG. 13 is a schematic diagram of a message format of downlink control information. As shown in FIG. 13, usually, the downlink control information may be a bit value sequence whose length is N bits, and N is a positive integer greater than or equal to 1. According to the descriptions of the polarization method indication information in Embodiment (1) and Embodiment (2), based on a quantity of polarization methods that may be used by the cell, the polarization method indication information may be a bit value whose length is 1 bit, or a bit value sequence whose length is 2 bits, 3 bits, or the like. Therefore, with reference to the message format of the downlink control information, one or more bit values of the downlink control information may be used as the polarization method indication information.

For example, when the satellite cell includes left hand circular polarization or right hand circular polarization, the polarization method indication information is a bit value whose length is 1 bit. For example, a bit value 1 may be used to indicate left hand circular polarization, and a bit value 0 may be used to indicate right hand circular polarization. The bit value of 1 bit may be the first bit value of the downlink control information as shown in FIG. 12, or may be a bit value at another location. Therefore, when the first bit value of the downlink control information is 1, the user equipment is indicated to receive the cell signal by using left circular polarization; or when the first bit value of the downlink control information is 0, the user equipment is indicated to receive the cell signal by using right hand circular polarization.

Step S402: The satellite base station sends, to the user equipment, the downlink control information that includes the polarization method indication information.

During specific implementation, the satellite base station transmits the downlink control information DCI on a physical downlink control channel (PDCCH). Therefore, the user equipment can receive the downlink control information DCI on the physical downlink control channel PDCCH, to obtain the polarization method indication information.

The satellite base station may periodically send the downlink control information DCI on the PDCCH, and the user equipment may periodically listen on a downlink control information DCI sending window for the PDCCH, to receive the downlink control information DCI. Specific manners of sending and receiving the downlink control information DCI by the satellite base station and the user equipment may be implemented according to an existing technical specification or standard. These are not specifically limited in this embodiment of this application.

Step S403: The user equipment communicates with the target cell based on the polarization method indication information. For example, the user equipment enables a corresponding port based on the indicated polarization method of the target cell, to receive the cell signal.

For example, if the polarization method indication information indicates that the user equipment should receive the cell signal by using left hand circular polarization, the user equipment may enable only a port corresponding to left hand circular polarization, to receive the cell signal, without enabling another port. Receiving the cell signal by the user equipment may be, for example, receiving and demodulating the cell signal at a location of a physical downlink shared channel (PDSCH) indicated by the downlink control information DCI.

It may be learned from the foregoing descriptions that, in the method provided in this embodiment of this application, the satellite base station configures the polarization method indication information in the downlink control information DCI, so that the user equipment learns the polarization method used to receive the cell signal, and enables the port corresponding to the polarization method, to receive the cell signal, without enabling a plurality of ports. Therefore, in the method provided in this embodiment of this application, energy consumption of the user equipment during communication with the base station can be reduced, and further interference from another cell can be avoided for the user equipment.

Embodiment (4)

This embodiment of this application provides an information transmission method. In the method, polarization methods of respective cells can be shared between two or more adjacent base stations, so that a base station can properly determine a polarization method of a cell of the base station based on a polarization method of a neighboring cell, thereby improving an inter-cell interference coordination capability.

Figure 14:
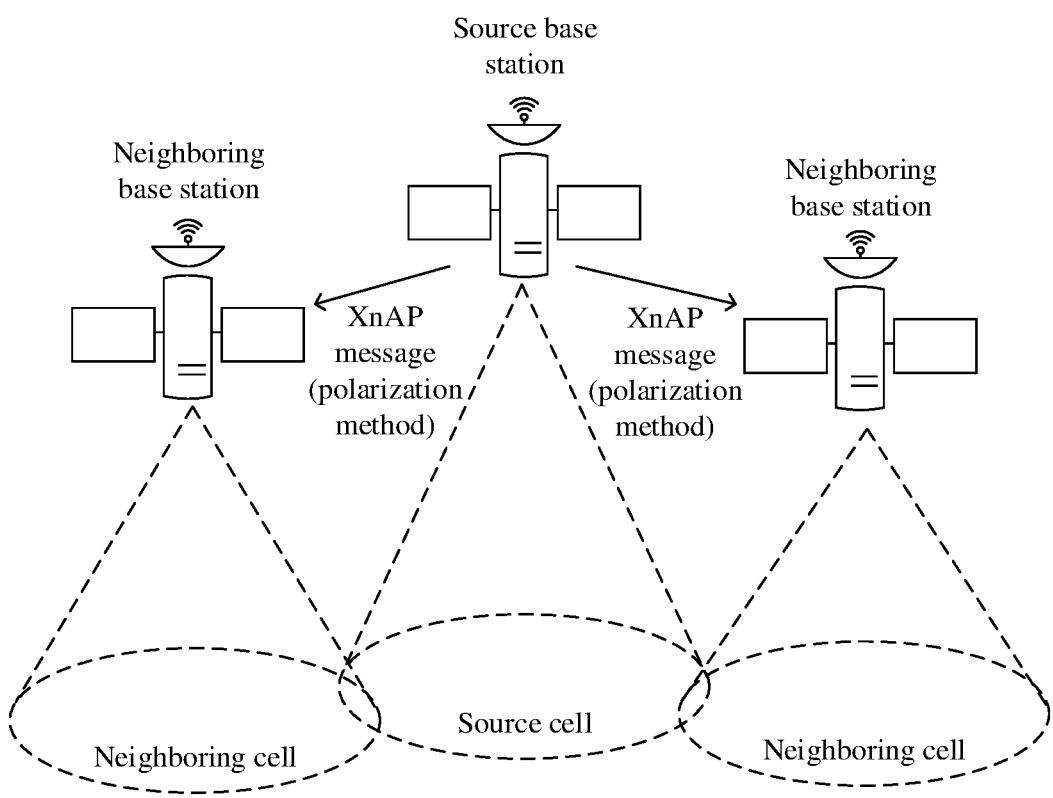
FIG. 14 is an example diagram of a scenario in which cell polarization methods are shared between base stations.

FIG. 14 is a diagram of a scenario in which cell polarization methods are shared between base stations. As shown in FIG. 14, a cell polarization method may be transmitted between base stations by using an Xn application protocol (XnAP) message. The Xn interface is an interface between the satellite base stations, and is mainly used for signaling interaction such as handover. The following uses a transmitter of an XnAP message as a source base station, uses a receiver of the XnAP message as a neighboring base station, uses a cell of the source base station as a source cell, and uses a cell of the neighboring base station as a neighboring cell, to describe a process of transmitting a cell polarization method between the base stations.

During specific implementation, the source base station may define a new polarization status (Polarization Status) message in the XnAP message, and the polarization status message includes a polarization method of the source cell. When the source base station is powered on and enabled or the polarization method of the source cell changes, the source base station sends a polarization status message to the neighboring base station, so that the neighboring base station obtains the latest polarization method of the source cell, or when the neighboring base station has recorded the polarization method of the source cell, the neighboring base station can update the polarization method of the source cell based on the latest obtained polarization status information.

For example, the polarization status message may have the following message format shown in Table 6:

TABLE 6

| IE group/Name Information element group/Name | Presence | Range | Range | IE type and reference Information element type and reference | Semantics description Semantics description | Criticality | Assigned criticality |
|---|---|---|---|---|---|---|---|
| Message type Message type | M | | | 9.2.13 | | Yes | Reject |
| Polarization status Polarization status | M | | 1 | Enumerated (LHCP, RHCP) Enumerated (left hand circular polarization, right hand circular polarization) | Polarization method of a source cell Polarization method of a source cell | — | |

It may be learned from the foregoing descriptions that, in the method provided in this embodiment of this application, the source base station adds the polarization status message to the XnAP message sent to the neighboring cell, to indicate the polarization method of the source cell to the neighboring cell, so that the neighboring base station can properly determine a polarization method of the neighboring cell based on the polarization method of the source cell, thereby improving an inter-cell interference coordination capability.

Embodiment (5)

This embodiment of this application provides an information transmission method. In this method, different polarization methods of cell signals are associated with different indication information. In this case, if user equipment determines a polarization method of a cell signal received by the user equipment, it means that the user equipment receives indication information associated with the polarization method. Therefore, the user equipment does not need to additionally send the indication information, thereby helping improve a throughput rate of information transmission between the user equipment and a base station.

During specific implementation, the polarization method may be associated with information whose length is 1 bit, and different polarization methods correspond to different information values. For example, left hand circular polarization may correspond to a bit value 0, and right hand circular polarization may correspond to a bit value 1. In this case, when the user equipment receives a cell signal of left hand circular polarization, it indicates that the user equipment receives the bit value 0; or when the user equipment receives a cell signal of right hand circular polarization, it indicates that the user equipment receives the bit value 1. For another example, left hand circular polarization may correspond to a bit value 1, and right hand circular polarization may correspond to a bit value 0. In this case, when the user equipment receives a cell signal of left hand circular polarization, it indicates that the user equipment receives the bit value 1; or when the user equipment receives a cell signal of right hand circular polarization, it indicates that the user equipment receives the bit value 0.

During specific implementation, the polarization method may be used to indicate an information block, for example, a master information block (MIB) or a system information block (SIB). The information associated with the polarization method may also be used as a data message transmitted by the base station to the user equipment.

Figure 15:
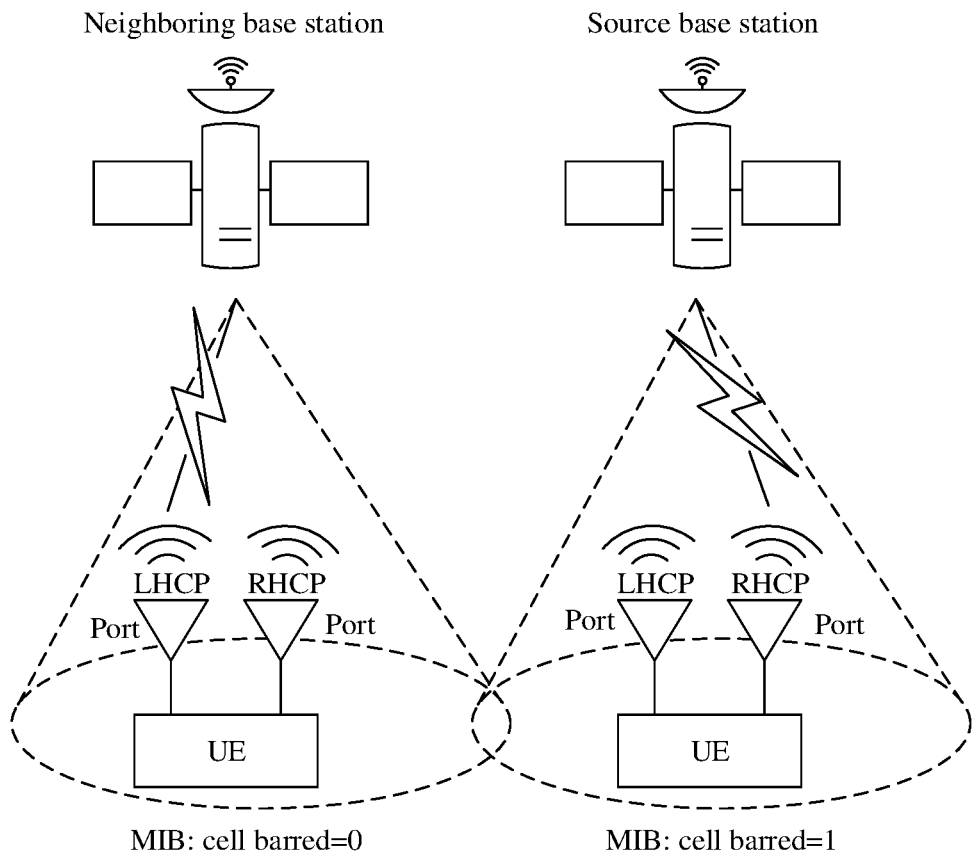
FIG. 15 is an example schematic diagram in which a satellite base station indicates a cell barred parameter by using a polarization method.

For example, the polarization method may be used to indicate a cell barred parameter in the master information block MIB, and the cell barred parameter indicates whether a cell is prohibited from being accessed. For example, when a value of the cell barred parameter is 1, it indicates that the cell is prohibited from being accessed; or when a value of the cell barred parameter is 0, it indicates that the cell is not prohibited from being accessed. FIG. 15 is a schematic diagram in which a satellite base station indicates a cell barred parameter by using a polarization method. As shown in FIG. 15, when performing cell handover, cell selection, or cell reselection, user equipment may enable ports corresponding to all polarization methods, to receive a cell signal. If the user equipment receives a cell signal on a port corresponding to left hand circular polarization, the cell signal is a signal of left hand circular polarization, and a value of a corresponding cell barred parameter is 0, indicating that a cell is not prohibited from being accessed; or if the user equipment receives a cell signal on a port corresponding to right hand circular polarization, the cell signal is a signal of right hand circular polarization, and a value of a corresponding cell barred parameter is 1, indicating that the cell is prohibited from being accessed.

Further, after determining the polarization method of the cell signal and the information block or the data message that is indicated by the polarization method, the user equipment may disable a port corresponding to another polarization method, to reduce power consumption.

In this embodiment of this application, correspondences between different polarization methods and different indication information and definitions of different information values may be determined by the base station and the user equipment through negotiation, or may be determined according to corresponding configurations and protocols. These are not specifically limited in this embodiment of this application.

It may be learned from the foregoing descriptions that, in the method provided in this embodiment of this application, the polarization method of the cell signal is used to indicate other information, such as the information block or the data message. Therefore, the user equipment does not need to additionally send this information, thereby helping improve a throughput rate of information transmission between the user equipment and the base station.

Figure 16:
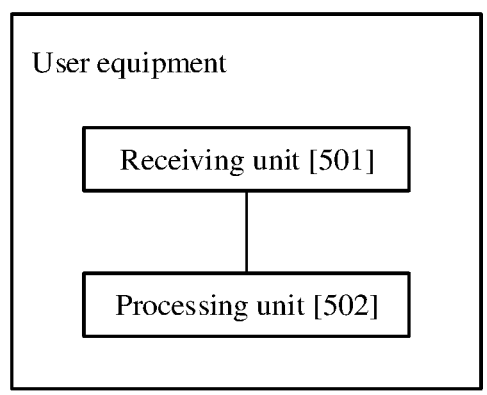
FIG. 16 is an example schematic diagram of a structure of user equipment according to an embodiment of this application.

FIG. 16 is a schematic diagram of a structure of user equipment according to an embodiment of this application. The user equipment may be, for example, a mobile phone, a tablet computer, an in-vehicle communications device, an on-board communications device, or a wearable device. As shown in FIG. 16, the user equipment includes:

a receiving unit 501, configured to receive first indication information, where the first indication information includes a polarization method of a target cell or a polarization method of a bandwidth part BWP; and a processing unit 502, configured to communicate with the target cell based on the first indication information.

During specific implementation, a first network device may be, for example, a satellite base station, including an evolved NodeB (eNB), a 5G gNodeB (gNB), and the like. The satellite base station is connected to a core network device in a wireless connection manner, and provides a wireless communication service for the user equipment. The target cell is a satellite cell to be accessed by the user equipment when the user equipment initiates cell handover, cell selection, or cell reselection. The target cell may belong to the first network device, or may belong to another network device.

Optionally, the receiving unit 501 is specifically configured to receive a radio resource control RRC message sent by the first network device, where the radio resource control message includes the first indication information.

Optionally, the receiving unit 501 is specifically configured to receive a system information block SIB, where the system information block includes the first indication information.

Optionally, the receiving unit 501 is specifically configured to receive downlink control information DCI, where the downlink control information includes the first indication information.

Optionally, the polarization method includes one or more of left hand circular polarization, right hand circular polarization, linear polarization, or elliptical polarization.

Optionally, the receiving unit 501 is configured to enable ports corresponding to all polarization methods, to receive a cell signal; and the processing unit 502 is configured to determine additional third indication information based on a polarization method of a received cell signal.

Figure 17:
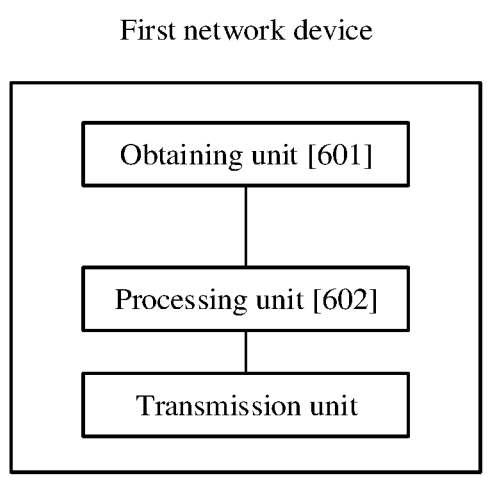
FIG. 17 is an example schematic diagram of a structure of a first network device according to an embodiment of this application.

FIG. 17 is a schematic diagram of a structure of a first network device according to an embodiment of this application. The first network device may be, for example, a satellite base station, including an evolved NodeB (eNB), a 5G gNodeB (gNB), and the like. The first network device includes:

an obtaining unit 601, configured to obtain a polarization method of a target cell; and a processing unit 602, configured to send first indication information to user equipment, where the first indication information includes the polarization method of the target cell.

Optionally, the processing unit 602 is specifically configured to generate a radio resource control RRC message, where the radio resource control message includes the first indication information.

Optionally, the processing unit 602 is specifically configured to generate a system information block SIB, where the system information block includes the first indication information.

Optionally, the processing unit 602 is specifically configured to generate downlink control information DCI, where the downlink control information includes the first indication information.

Optionally, the polarization method includes one or more of left hand circular polarization, right hand circular polarization, linear polarization, or elliptical polarization.

Optionally, the obtaining unit 601 is specifically configured to receive second indication information, where the second indication information includes the polarization method of the target cell, and the target cell belongs to a second network device.

Figure 18:
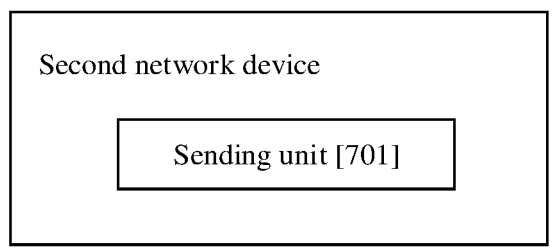
FIG. 18 is an example schematic diagram of a structure of a second network device according to an embodiment of this application.

FIG. 18 is a schematic diagram of a structure of a second network device according to an embodiment of this application. The second network device may be, for example, a satellite base station, including an evolved NodeB (eNB), a 5G gNodeB (gNB), and the like. The second network device includes:

a sending unit 701, configured to send second indication information to a first network device, where the second indication information includes a polarization method of a target cell, and the target cell belongs to the second network device.

In the embodiments of this application, some units (or components) of the first network device or the second network device may be implemented by using a hardware circuit, and some other units (or components) are implemented by using software, or all units (or components) may be implemented by using a hardware circuit, or all units (or components) are implemented by using software.

Figure 19:
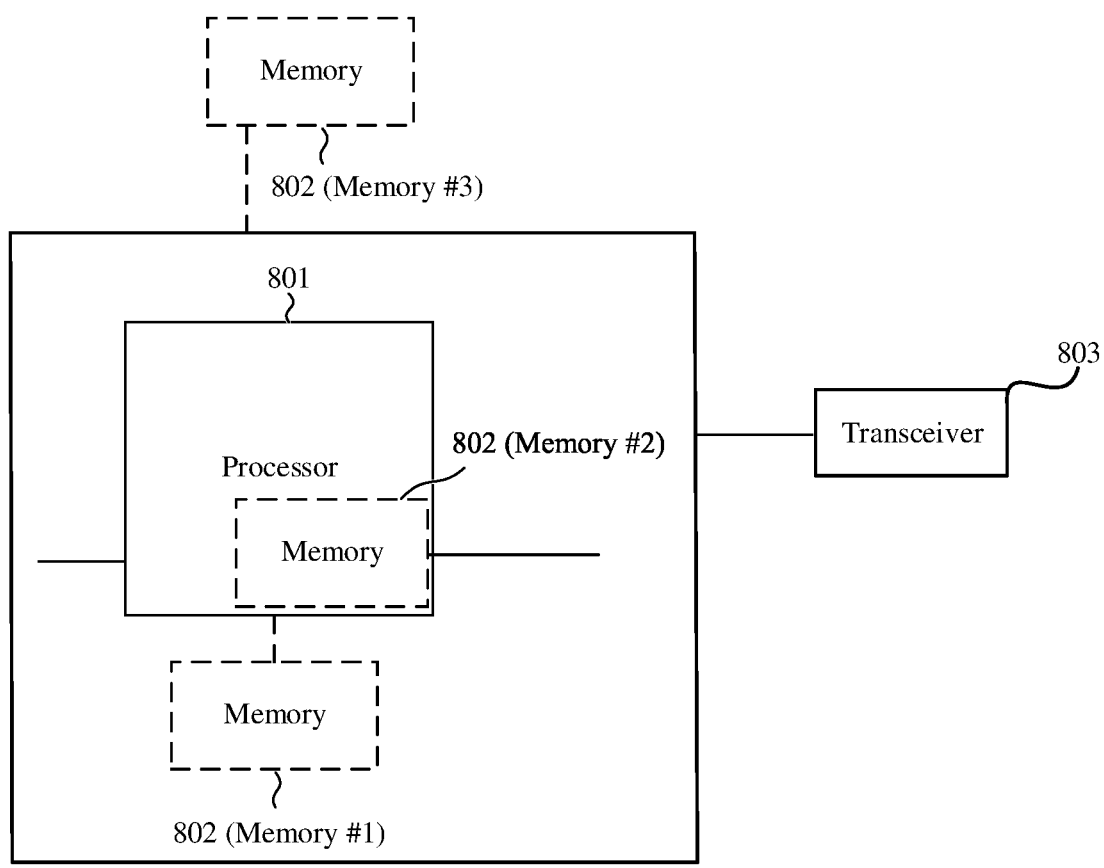
FIG. 19 is an example schematic diagram of a structure of user equipment according to an embodiment of this application.

FIG. 19 is a schematic diagram of a structure of user equipment according to an embodiment of this application. The user equipment may be, for example, a mobile phone, a tablet computer, an in-vehicle communications device, an on-board communications device, or a wearable device. As shown in FIG. 18, the user equipment includes:

a processor 801 and a memory 802, where the memory 802 may be independent of the processor 801 or the user equipment (a memory #3), or may be in the processor 801 or the user equipment (a memory #1 or a memory #2). The memory 802 may be a physically independent unit, or may be storage space, a network hard disk, or the like on a cloud server.

The memory 802 is configured to store computer-readable instructions (or referred to as a computer program).

The processor 801 is configured to read the computer-readable instructions to implement the method provided in any one of the foregoing aspects related to the user equipment and the implementations of the foregoing aspects.

Optionally, the user equipment further includes a transceiver 803, configured to receive and send data.

Figure 20:
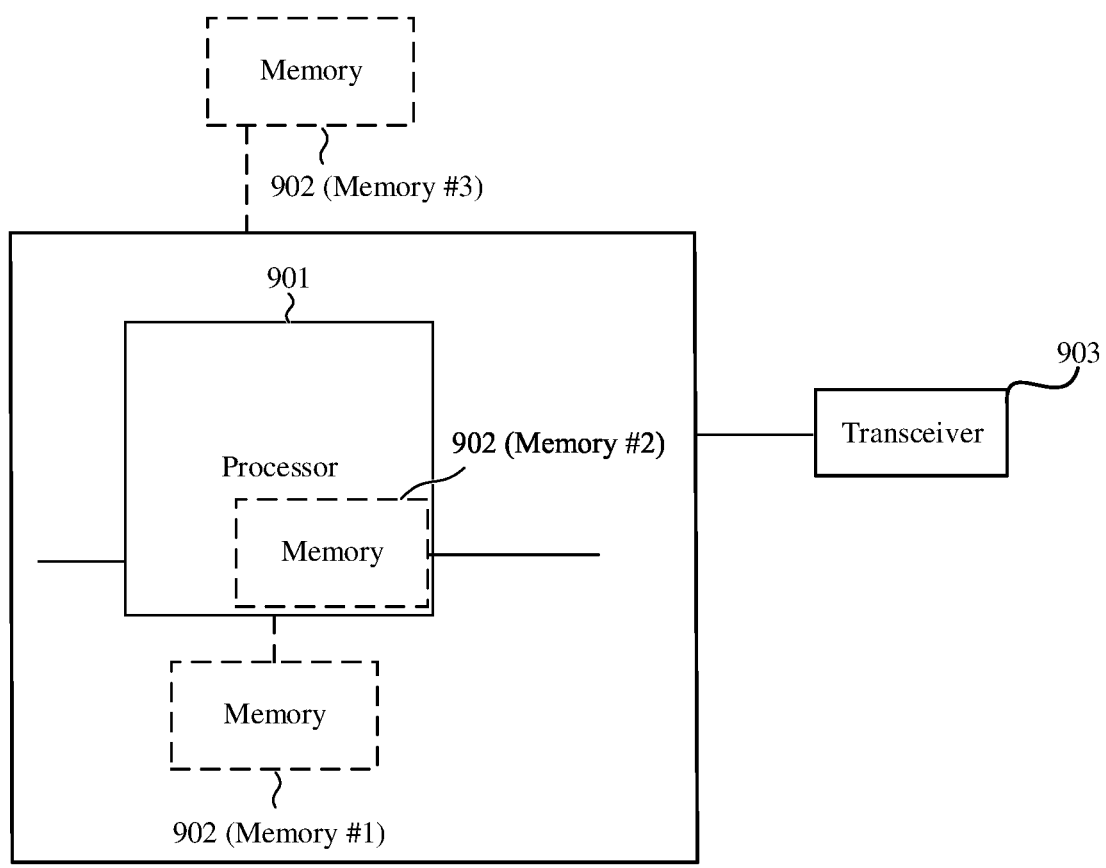
FIG. 20 is an example schematic diagram of a structure of a network device according to an embodiment of this application.

FIG. 20 is a schematic diagram of a structure of a network device according to an embodiment of this application. The network device may be, for example, a satellite base station, including an evolved NodeB (eNB), a 5G gNodeB (gNB), and the like. The network device includes a processor 901 and a memory 902, where the memory 902 may be independent of the processor 901 or the network device (a memory #3), or may be in the processor 901 or the network device (a memory #1 or a memory #2). The memory 902 may be a physically independent unit, or may be storage space, a network hard disk, or the like on a cloud server.

The memory 902 is configured to store computer-readable instructions (or referred to as a computer program).

The processor 901 is configured to read the computer-readable instructions to implement the method provided in any one of the foregoing aspects related to the first network device or the second network device and the implementations of the foregoing aspects.

Optionally, the network device further includes a transceiver 903, configured to receive and send data.

In addition, the processor 801 or 901 may be a central processing unit, a general-purpose processor, a digital signal processor, an application-specific integrated circuit, a field programmable gate array or another programmable logic device, a transistor logic device, a hardware component, or any combination thereof. The processor may implement or execute various examples of logical blocks, modules, and circuits described with reference to the content disclosed in this application. Alternatively, the processor may be a combination of processors implementing a computing function, for example, a combination of one or more microprocessors, or a combination of a digital signal processor and a microprocessor. In addition, the memory 802 or 902 may include a volatile memory, for example, a random access memory (RAM). The memory may alternatively include a non-volatile memory, for example, a flash memory, a hard disk drive (HDD), a solid-state drive (SSD), a cloud storage, a network attached storage (NAS), or a network drive. The memory may alternatively include a combination of memories of the foregoing types, or another medium or product in any form that has a storage function.

An embodiment of this application further provides a communications system. The system includes user equipment, a first network device, and a second network device. The user equipment is the user equipment described in the embodiment corresponding to FIG. 16, the first network device is the first network device described in the embodiment corresponding to FIG. 17, and the second network device is the second network device described in the embodiment corresponding to FIG. 18. Specifically, the user equipment may be, for example, a mobile phone, a tablet computer, an in-vehicle communications device, an on-board communications device, or a wearable device. The first network device and the second network device each may be, for example, a satellite base station, including an evolved NodeB (eNB), a 5G gNodeB (gNB), and the like.

An embodiment of this application further provides a communications system. The system includes user equipment, a first network device, and a second network device. The user equipment is the user equipment described in the embodiment corresponding to FIG. 19, the first network device is the network device described in the embodiment corresponding to FIG. 20, and the second network device is the network device described in the embodiment corresponding to FIG. 20. Specifically, the user equipment may be, for example, a mobile phone, a tablet computer, an in-vehicle communications device, an on-board communications device, or a wearable device. The first network device and the second network device each may be, for example, a satellite base station, including an evolved NodeB (eNB), a 5G gNodeB (gNB), and the like.

An embodiment of this application further provides a computer-readable medium. The computer-readable medium stores computer program instructions. When the computer program instructions are executed by a computer, the method in any one of the foregoing embodiments is implemented.

An embodiment of this application further provides a computer program product. When the computer program product is executed by a computer, the method in any one of the foregoing embodiments is implemented.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for a detailed working process of the system and apparatus described above, refer to a corresponding process in the foregoing method embodiments.

In the several embodiments provided in this application, it should be understood that the disclosed system, apparatus, and method may be implemented in other manners. For example, the described apparatus embodiments are merely examples. For example, unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one location, or may be distributed on a plurality of network units. Some or all of the units may be selected depending on actual requirements to achieve the objectives of the solutions in the embodiments.

In addition, functional units in the embodiments of this application may be integrated into one processing unit, or each of the units may exist alone physically, or two or more units may be integrated into one unit.

When functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application.

The foregoing descriptions are merely specific embodiments of the present technology, but are not intended to limit the protection scope of the present technology. Any variation or replacement readily figured out by a person skilled in the art within the technical scope disclosed in the present technology shall fall within the protection scope of the present technology. Therefore, the protection scope of the present technology shall be subject to the protection scope of the claims.

Embodiment (6)

Figure 21:
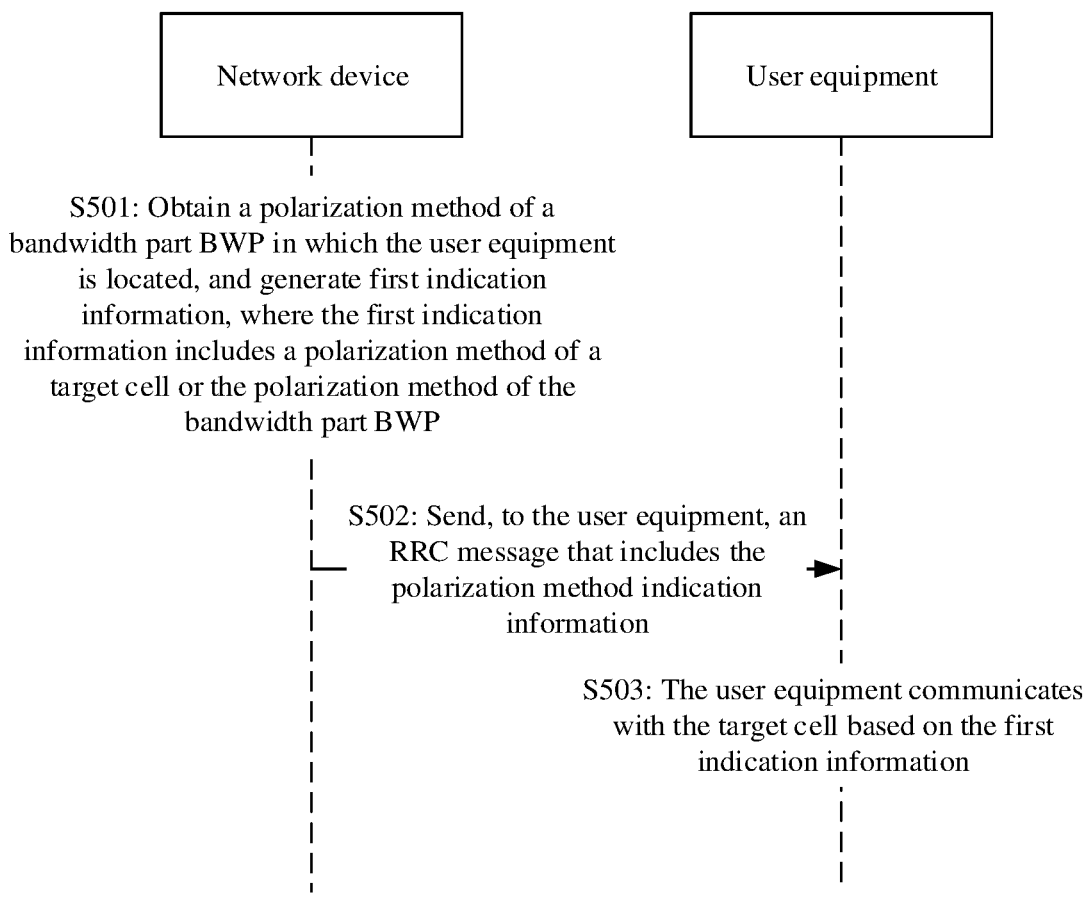
FIG. 21 is an example flowchart of an information transmission method according to an embodiment of this application.

As shown in FIG. 21, an embodiment of another provided method is specifically as follows:

Step S501: A network device obtains a polarization method of a bandwidth part (BWP) in which the user equipment is located, and generates first indication information, where the first indication information includes a polarization method of a target cell or the polarization method of the bandwidth part BWP.

A case in which the first indication information includes the polarization method of the target cell has been specifically described in the foregoing embodiments. For details, refer to the descriptions in the foregoing embodiments. A case in which the first indication information includes the polarization method of the bandwidth part BWP is specifically described herein.

For example, the network device is a serving base station. The first indication information may be carried in a radio resource control (RRC) message or a system information block (SIB) in a serving cell. Herein, an example in which the polarization method indication information of the BWP is configured in the RRC message is used for description. In the foregoing embodiments, the polarization method indication information of the BWP may be configured in either the RRC message or the SIB message.

During specific implementation, the polarization method indication information may be configured in, for example, a BWP Info information element (BWP Info information element) field of the RRC message.

Alternatively, the system information block SIB may usually include a plurality of types, for example, a SIB 1 to a SIB x (where x is a positive integer greater than 1), and the polarization method indication information may be configured in one or more types of the system information block SIB.

The polarization method of the BWP in which the user equipment is located may specifically include a polarization method of a target cell common BWP in which the user equipment is located and a polarization method of a BWP specific to the user equipment.

A specific message format of the BWP information element is as follows:

```
-- ASN1START
-- TAG-BWP-START
BWP ::=    SEQUENCE (
    locationAndBandwidth    INTEGER (0..37949),
    subcarrierSpacing    SubcarrierSpacing,
    cyclicPrefix    ENUMERATED { extended )}    OPTIONAL
-- Need R}
    polarization    ENUMERATED {RHCP, LHCP)
--TAG-BWP-STOP
-- ASN1STOP
```

For example, for implementation of content of the polarization (Polarization) field in the bandwidth part information element, refer to the following Table 7:

TABLE 7

Bandwidth part field descriptions (BWP field descriptions)

Polarization (Polarization)
1 bit (bit), BWP polarization method;

According to the descriptions in Table 7, the polarization (Polarization) method of the target cell may be indicated by adding a bit value whose length is 1 bit to the RRC message, corresponding to a case in which the target cell may use, for example, left hand circular polarization or right hand circular polarization. In this case, a bit value 1 may be used to indicate left hand circular polarization, and a bit value 0 may be used to indicate right hand circular polarization; or a bit value 1 may be used to indicate right hand circular polarization, and a bit value 0 may be used to indicate left hand circular polarization. It should be additionally noted herein that polarization methods of the target cell that are specifically indicated by using the bit value 1 and the bit value 0 may be determined by the serving base station and the user equipment through negotiation, or may be determined according to a corresponding configuration and protocol. A correspondence between a bit value and a polarization method is not specifically limited in this embodiment of this application.

For example, for implementation of content of the polarization (Polarization) field in the MobilityControlInfo information element, refer to a manner described in Table 8:

TABLE 8

MobilityControlInfo field descriptions (MobilityControlInfo field descriptions)

Polarization (Polarization)
2 bits (bit), cell polarization method;

According to the descriptions in Table 8, the polarization (Polarization) method of the target cell may be indicated by adding a bit value sequence whose length is 2 bits to the RRC message, corresponding to a case in which the target cell may have two or more polarization methods. For example, when the target cell may use left hand circular polarization, right hand circular polarization, left hand elliptical polarization, or right hand elliptical polarization, a bit value sequence 00 may be used to represent left hand circular polarization, a bit value sequence 01 may be used to represent right hand circular polarization, a bit value sequence 10 may be used to represent left hand elliptical polarization, and a bit value sequence 11 may be used to represent right hand elliptical polarization. It should be additionally noted herein that polarization methods of the target cell that are specifically indicated by using different values of the bit value sequence may be determined by the serving base station and the user equipment through negotiation, or may be determined according to a corresponding configuration and protocol, and may be configured in the user equipment and the serving base station. A correspondence between a bit value sequence and a polarization method is not specifically limited in this embodiment of this application.

It is easily understand that, in this embodiment of this application, the length of the bit value or the bit value sequence that is used to indicate the polarization method of the target cell and that is added to the RRC message may be determined based on a quantity of polarization methods that may be used by the target cell. Therefore, the length of the bit value or the bit value sequence may not be limited to 1 bit or 2 bits. When the target cell may use more polarization methods to transmit satellite signals, a person skilled in the art can easily figure out, based on the disclosure in the embodiments of this application, that the length of the bit value sequence continues to be increased, for example, is increased to 3 bits or 4 bits, to indicate more polarization methods. This falls within the protection scope of the embodiments of this application.

It should be additionally noted that in a specific implementation of step S501, the polarization method indication information may be used to indicate polarization methods of a plurality of BWPs of the target cell, and the BWP of the target cell of the user equipment is one of the plurality of BWPs. As shown in Table 9, the polarization method indication information may specifically include a target cell ID (CID), a bandwidth part ID (BWP ID), and a corresponding bit value or bit value sequence used to indicate the polarization method of the BWP.

According to the descriptions in Table 9, a target cell whose CID is 4600012345 includes a plurality of BWPs whose BWP IDs are 00, 01, 10, 11, and the like. A polarization method corresponding to a BWP 00 is left hand circular polarization, indicated by using a bit value 0, and a polarization method corresponding to a BWP 01 is right hand circular polarization, indicated by using a bit value 1.

TABLE 9

| Cell ID | BWP ID | Polarization method |
|---|---|---|
| 4600012345 | 00 | 0 |
| 4600012345 | 01 | 1 |
| 4600012345 | 10 | 1 |
| 4600012345 | 11 | 0 |
| . . . | . . . | . . . |

Step S502: The network device sends, to the user equipment, the RRC message that includes the polarization method indication information.

For example, in 5th generation new radio (5G NR) and long term evolution (LTE), the user equipment and the serving base station may include two or three RRC modes. Specifically, in 5G NR, the user equipment and the serving base station may include three RRC modes: RRC_CONNECTED (RRC_CONNECTED), RRC_IDLE (RRC_IDLE), and RRC_INACTIVE (RRC_INACTIVE), and in LTE, the user equipment and the serving base station may include two RRC modes: RRC_CONNECTED (RRC_CONNECTED) and RRC_IDLE (RRC_IDLE).

In RRC_CONNECTED, an RRC connection is established between the user equipment and the serving base station, so that the user equipment can exchange signaling or data with the serving base station. When the UE moves between cells, a network side controls the user equipment to perform cell handover (for example, the user equipment to be handed over from the serving cell to the target cell), that is, the network side controls mobility of the user equipment. In RRC_IDLE, there is no RRC connection between the user equipment and the base station. If the user equipment needs to exchange signaling or data with the base station, the user equipment needs to initiate an RRC connection to the base station, to enter RRC_CONNECTED from RRC_IDLE. The user equipment monitors paging information of the base station in RRC_IDLE. When moving between cells, the user equipment performs cell reselection, that is, the user equipment controls mobility of the user equipment. In RRC_INACTIVE, there is no RRC connection between the user equipment and the base station. However, the last serving base station of the user equipment stores context information of the user equipment, so that the user equipment is quickly transferred to RRC_CONNECTED from RRC_INACTIVE. When moving between cells, the user equipment performs cell reselection, that is, the user equipment controls mobility of the user equipment.

Based on the foregoing possible RRC modes, step S502 may be selectively implemented in RRC_CONNECTED. When the user equipment and the serving base station are in RRC_CONNECTED, an RRC connection is established between the serving base station and the user equipment, so that the serving base station can send, to the user equipment by using the RRC connection, the RRC message that includes the polarization method indication information.

It should be additionally noted that, in a specific implementation of step S502, the serving base station may actively send, to the user equipment, the RRC message that includes the polarization method indication information, without receiving any request from the user equipment; or the user equipment may actively initiate, to the serving base station, a request message used to obtain the polarization indication information, so that when receiving the request message, the serving base station sends, to the user equipment based on the request message, the RRC message that includes the polarization method indication information.

Optionally, when the user equipment obtains the polarization indication information from the RRC message of the serving base station through demodulation, the user equipment may further send an acknowledgment message, such as an ACK message, to the serving base station, to indicate that the serving base station does not need to continue to send, to the user equipment, the RRC message that includes the polarization indication information, thereby reducing signaling overheads.

Step S503: The user equipment communicates with the target cell based on the first indication information.

In the method provided in the foregoing embodiment, the user equipment obtains the first indication information, where the first indication information includes the polarization method of the bandwidth part BWP; and the user equipment sends or receives a cell signal of the target cell based on the first indication information. Therefore, in the foregoing provided method for adding a polarization indication to a BWP, the user equipment can be indicated, in different beams or a given bandwidth part BWP, to complete communication and transmission by using an indicated polarization method, and signal interference from another neighboring cell can be reduced.

In addition, the descriptions of the apparatus parts in the foregoing embodiments are also applicable to Embodiment (6).

What is claimed is:

1. An information transmission method, comprising:
   obtaining, by user equipment, first indication information via a serving cell, wherein the first indication information comprises:
   a polarization method of a target cell, or
   a polarization method of a bandwidth part (BWP) of the target cell; and
   communicating, by the user equipment, with the target cell based on the first indication information after entering the target cell, wherein
   the serving cell is different from the target cell,
   the user equipment obtains the polarization method, via the serving cell, before the user equipment enters the target cell, and
   the target cell includes at least one neighbor cell.

2. The method according to claim 1, wherein obtaining the first indication information comprises:
   receiving, by the user equipment, a radio resource control (RRC) message, wherein the RRC message comprises the first indication information.

3. The method according to claim 1, wherein obtaining the first indication information comprises:
   receiving, by the user equipment, a system information block (SIB), wherein the SIB comprises the first indication information.

4. The method according to claim 1, wherein obtaining the first indication information comprises:
receiving, by the user equipment, downlink control information (DCI), wherein the DCI comprises the first indication information.

5. The method according to claim 1, wherein the polarization method of the target cell or the polarization method of the BWP comprises one or more of left hand circular polarization, right hand circular polarization, linear polarization, or elliptical polarization.

6. The method according to claim 1, further comprising:
enabling a port of the user equipment, based on the first indication information, without enabling any other ports of the user equipment; and
communicating with the target cell using the enabled port of the user equipment.

7. The method according to claim 1, wherein the polarization method is indicated by adding a bit value, having a first length, to the first indication information.

8. A non-transitory computer-readable storage medium having computer program instructions stored therein, wherein when the computer program instructions are run on a computer, the computer is enabled to perform the information transmission method according to claim 1.

9. An information transmission method, comprising:
obtaining, by a first network device, a polarization method of a target cell or a polarization method of a bandwidth part (BWP) of the target cell;
generating, by the first network device, first indication information, wherein the first indication information comprises:
the polarization method of the target cell, or
the polarization method of the BWP of the target cell; and
sending, by the first network device, the first indication information via a serving cell to a first device, wherein
the serving cell is different from the target cell,
the first indication information is sent via the serving cell to the first device before the first device enters the target cell, and
the target cell includes at least one neighbor cell.

10. The method according to claim 9, wherein generating the first indication information comprises:
generating, by the first network device, a radio resource control (RRC) message, wherein the RRC message comprises the first indication information.

11. The method according to claim 9, wherein generating the first indication information comprises:
generating, by the first network device, a system information block (SIB), wherein the SIB comprises the first indication information.

12. The method according to claim 9, wherein generating the first indication information comprises:
generating, by the first network device, downlink control information (DCI), wherein the DCI comprises the first indication information.

13. The method according to claim 9, wherein the polarization method of the target cell or the polarization method of the BWP comprises one or more of left hand circular polarization, right hand circular polarization, linear polarization, or elliptical polarization.

14. The method according to claim 9, wherein obtaining the polarization method of the target cell or the polarization method of the BWP of the target cell comprises:
obtaining, by the first network device, second indication information, wherein the second indication information comprises the polarization method of the target cell or the polarization method of the BWP of the target cell, and the target cell belongs to a second network device.

15. A non-transitory computer-readable storage medium having computer program instructions stored therein, wherein, when the computer program instructions are run on a computer, the computer is enabled to perform the information transmission method according to claim 9.

16. A user equipment, comprising:
a transceiver, configured to receive first indication information via a serving cell, wherein the first indication information comprises:
a polarization method of a target cell, or
a polarization method of a bandwidth part (BWP) of the target cell; and
a processor configured to, in association with the transceiver, communicate with the target cell based on the first indication information after entering the target cell, wherein,
the serving cell is different from the target cell,
the user equipment receives the polarization method, via the serving cell, before the user equipment enters the target cell, and
the target cell includes at least one neighbor cell.

17. The user equipment according to claim 16, wherein
the transceiver is configured to receive any of a radio resource control (RRC) message, a system information block (SIB), or downlink control information (DCI), and
any of the RRC message, the SIB, or the DCI comprise the first indication information.

18. The user equipment according to claim 16, wherein the polarization method of the target cell or the polarization method of the BWP comprises one or more of left hand circular polarization, right hand circular polarization, linear polarization, or elliptical polarization.

19. A first network device, comprising:
a transceiver configured to obtain a polarization method of a target cell or a polarization method of a bandwidth part (BWP) of the target cell; and
a processor configured to generate first indication information based on the polarization method of the target cell or the polarization method of the BWP of the target cell, wherein the first indication information comprises:
the polarization method of the target cell, or
the polarization method of the BWP of the target cell; and
the transceiver is configured to transmit the first indication information via a serving cell to a first device, wherein
the serving cell is different from the target cell,
the first indication information is sent via the serving cell to the first device before the first device enters the target cell, and
the target cell includes at least one neighbor cell.

20. The first network device according to claim 19, wherein
the processor is configured to generate a radio resource control (RRC) message, wherein the RRC message comprises the first indication information.

21. The first network device according to claim 19, wherein
the processor is configured to generate a system information block (SIB), wherein the SIB comprises the first indication information.

22. The first network device according to claim 19, wherein
- the processor is configured to generate downlink control information (DCI), wherein the DCI comprises the first indication information.

23. The first network device according to claim 19, wherein the polarization method of the target cell or the polarization method of the BWP comprises one or more of left hand circular polarization, right hand circular polarization, linear polarization, or elliptical polarization.

24. The first network device according to claim 19, wherein
- the transceiver is configured to receive second indication information, wherein the second indication information comprises the polarization method of the target cell or the polarization method of the BWP of the target cell, and the target cell belongs to a second network device.

* * * * *